(12) United States Patent
Ohtsubo et al.

(10) Patent No.: US 10,497,500 B2
(45) Date of Patent: Dec. 3, 2019

(54) POWDER MAGNETIC CORE, POWDER FOR MAGNETIC CORES, AND METHODS OF MANUFACTURING THEM

(71) Applicant: TOYOTA JIDOSHA KABUSHIKI KAISHA, Toyota-shi, Aichi-ken (JP)

(72) Inventors: Masashi Ohtsubo, Nagakute (JP); Masaaki Tani, Nagakute (JP); Takeshi Hattori, Nagakute (JP); Jung hwan Hwang, Nagakute (JP); Masashi Hara, Nagakute (JP); Shin Tajima, Nagakute (JP); Naoki Iwata, Toyota (JP); Shinjiro Saigusa, Toyota (JP); Kohei Ishii, Nagoya (JP); Daisuke Okamoto, Toyota (JP); Toshimitsu Takahashi, Toyota (JP)

(73) Assignee: TOYOTA JIDOSHA KABUHIKI KAISHA, Toyota-shi, Aichi-ken (JP)

( * ) Notice: Subject to any disclaimer, the term of this patent is extended or adjusted under 35 U.S.C. 154(b) by 296 days.

(21) Appl. No.: 15/500,957

(22) PCT Filed: Sep. 4, 2015

(86) PCT No.: PCT/JP2015/075209
§ 371 (c)(1),
(2) Date: Feb. 1, 2017

(87) PCT Pub. No.: WO2016/039267
PCT Pub. Date: Mar. 17, 2016

(65) Prior Publication Data
US 2017/0263359 A1    Sep. 14, 2017

(30) Foreign Application Priority Data
Sep. 8, 2014 (JP) ................................ 2014-182709

(51) Int. Cl.
| | |
|---|---|
| H01F 3/08 | (2006.01) |
| H01F 1/147 | (2006.01) |
| H01F 1/24 | (2006.01) |
| B22F 1/02 | (2006.01) |
| C03C 8/02 | (2006.01) |
| C03C 8/04 | (2006.01) |
| C03C 8/08 | (2006.01) |
| C22C 38/02 | (2006.01) |
| C22C 38/06 | (2006.01) |
| H01F 41/02 | (2006.01) |

(52) U.S. Cl.
CPC ................. *H01F 3/08* (2013.01); *B22F 1/02* (2013.01); *C03C 8/02* (2013.01); *C03C 8/04* (2013.01); *C03C 8/08* (2013.01); *C22C 38/02* (2013.01); *C22C 38/06* (2013.01); *H01F 1/147* (2013.01); *H01F 1/14791* (2013.01); *H01F 1/24* (2013.01); *H01F 41/0246* (2013.01); *C03C 2209/00* (2013.01)

(58) Field of Classification Search
CPC ........ H01F 3/08; H01F 1/147; H01F 1/14791; H01F 41/0246; B22F 1/02
See application file for complete search history.

(56) References Cited

U.S. PATENT DOCUMENTS

| | | |
|---|---|---|
| 7,083,760 B2 | 8/2006 | Kondo et al. |
| 9,941,039 B2 | 4/2018 | Okamoto et al. |
| 2002/0034453 A1 | 3/2002 | Kondo et al. |
| 2002/0043303 A1 | 4/2002 | Takemoto et al. |
| 2002/0097124 A1 | 7/2002 | Inoue et al. |
| 2011/0024671 A1 | 2/2011 | Otsuki et al. |
| 2012/0092106 A1 | 4/2012 | Takahashi et al. |
| 2012/0326830 A1 | 12/2012 | Oshima et al. |
| 2013/0015939 A1 | 1/2013 | Inagaki et al. |
| 2013/0136933 A1 | 5/2013 | Matsutani et al. |
| 2013/0228716 A1 | 9/2013 | Suetsuna et al. |
| 2013/0228717 A1 | 9/2013 | Harada et al. |

(Continued)

FOREIGN PATENT DOCUMENTS

| | | |
|---|---|---|
| JP | 2002-141213 A | 5/2002 |
| JP | 3309970 B2 | 7/2002 |

(Continued)

OTHER PUBLICATIONS

English translation for JP 2006-233268, Sep. 7, 2003.*

(Continued)

*Primary Examiner* — C Melissa Koslow
(74) *Attorney, Agent, or Firm* — Sughrue Mion, PLLC

(57) ABSTRACT

A powder magnetic core having excellent specific resistance or strength. The powder magnetic core has soft magnetic particles, first coating layers that coat the surfaces of the soft magnetic particles and include aluminum nitride, and second coating layers that coat at least a part of the surfaces of the first coating layers and include a low-melting-point glass having a softening point lower than an annealing temperature for the soft magnetic particles. The first coating layers including aluminum nitride are excellent in the wettability to the low-melting-point glass which constitutes the second coating layers and suppress diffusion of constitutional elements between the soft magnetic particles and the low-melting-point glass of the second coating layers. The powder magnetic core can stably exhibit a higher specific resistance and higher strength than the prior art owing to such a synergistic action of the first coating layers and second coating layers.

10 Claims, 9 Drawing Sheets

(56) References Cited

U.S. PATENT DOCUMENTS

| | | |
|---|---|---|
| 2014/0374644 A1 | 12/2014 | Eguch et al. |
| 2015/0287507 A1 | 10/2015 | Nishio et al. |
| 2015/0364235 A1 | 12/2015 | Okamoto et al. |
| 2016/0071636 A1 | 3/2016 | Ohtsubo et al. |
| 2016/0086705 A1 | 3/2016 | Eguch et al. |
| 2016/0086717 A1 | 3/2016 | Harada et al. |
| 2017/0110227 A1 | 4/2017 | Okamoto et al. |
| 2017/0263359 A1 | 9/2017 | Ohtsubo et al. |

FOREIGN PATENT DOCUMENTS

| | | | |
|---|---|---|---|
| JP | 2003-243215 A | | 8/2003 |
| JP | 2004-253787 A | | 9/2004 |
| JP | 2006-233268 | * | 9/2006 |
| JP | 2006-233268 A | | 9/2006 |
| JP | 4024705 B2 | | 12/2007 |
| JP | 2008-297622 A | | 12/2008 |
| JP | 2009-296015 A | | 12/2009 |
| JP | 2012-049203 A | | 3/2012 |
| JP | 2013-171967 A | | 9/2013 |

OTHER PUBLICATIONS

Communication dated Oct. 10, 2017, from Japanese Patent Office in counterpart application No. 2015-174749.
Communication dated Jun. 5, 2018, from the Japanese Patent Office in counterpart application No. 2015-174749.
International Search Report for application No. PCT/JP2015/075209 dated Nov. 24, 2015.
Communication dated Jan. 25, 2018 issued by the United States Patent and Trademark Office in U.S. Appl. No. 15/291,350.
Non-Final Office Action dated Jun. 26, 2018 issued by the United States Patent and Trademark Office in U.S. Appl. No. 15/291,350.
Final Office Action dated Jan. 28, 2019 issued by the United States Patent and Trademark Office in U.S. Appl. No. 15/291,350.
Notice of Allowance dated Aug. 28, 2019 from the United States Patent and Trademark Office in U.S. Appl. No. 15/291,350.

* cited by examiner

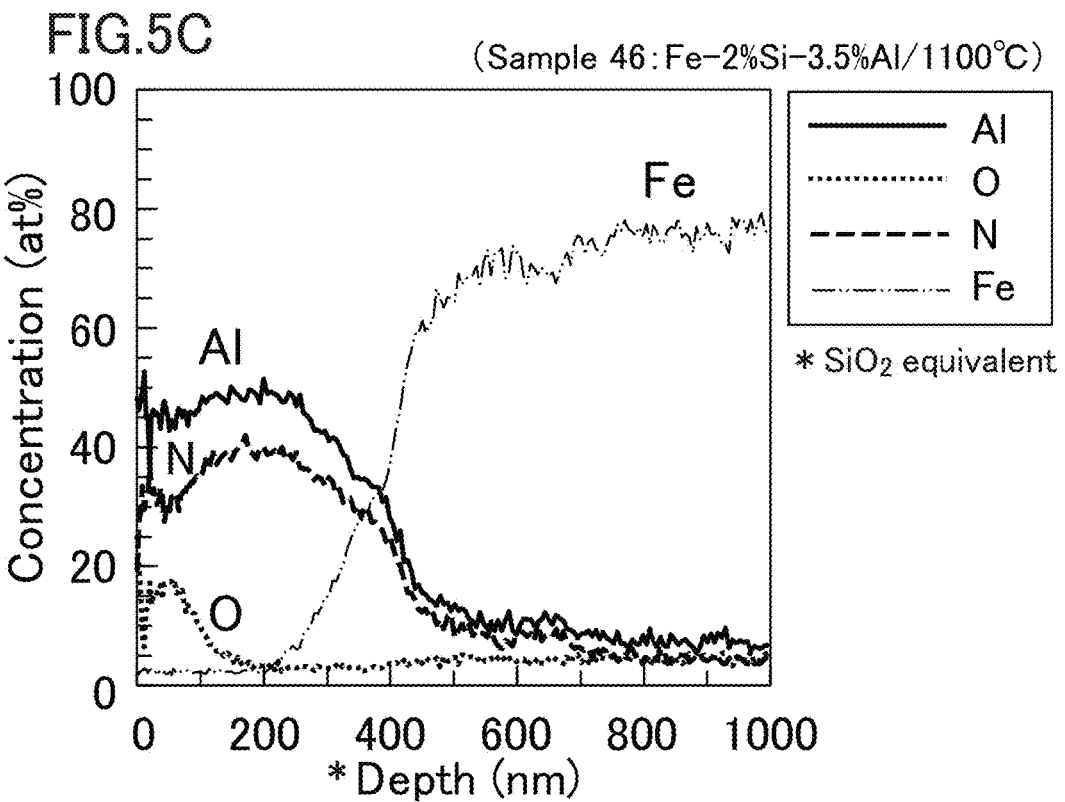
FIG.5C (Sample 46: Fe-2%Si-3.5%Al/1100°C)
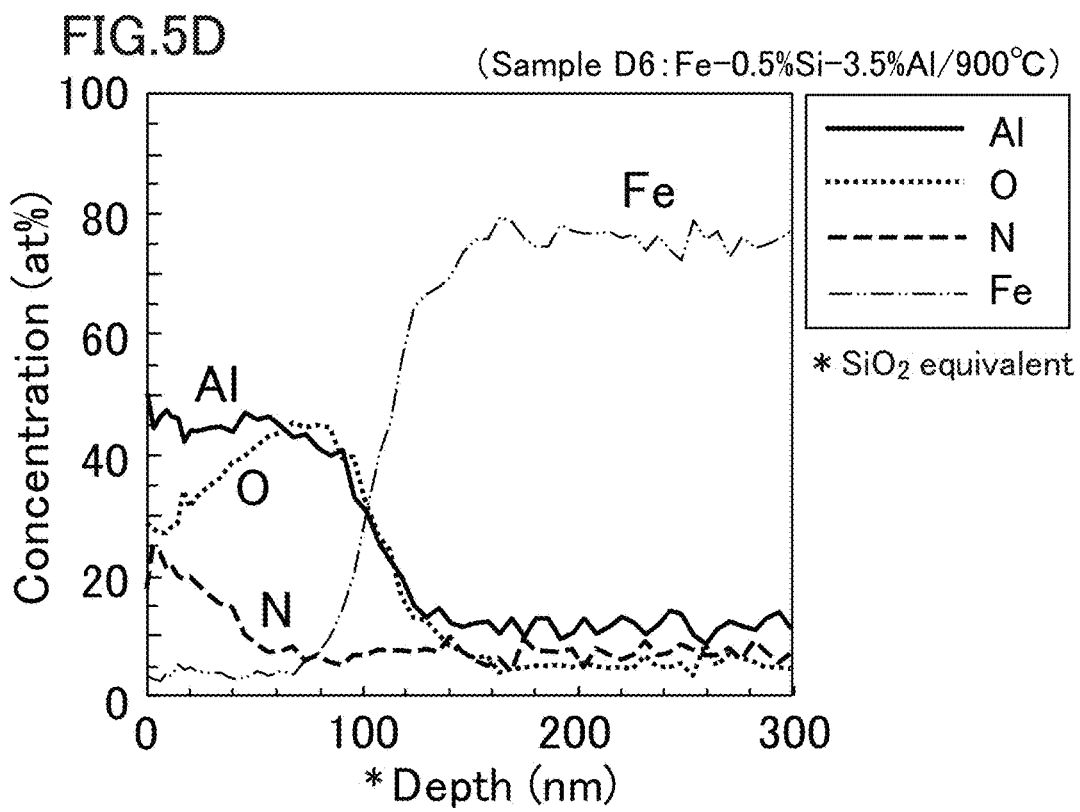
FIG.5D (Sample D6: Fe-0.5%Si-3.5%Al/900°C)

POWDER MAGNETIC CORE, POWDER FOR MAGNETIC CORES, AND METHODS OF MANUFACTURING THEM

TECHNICAL FIELD

The present invention relates to a powder magnetic core that is excellent in the volume specific resistance value (referred simply to as a "specific resistance," hereinafter) or the strength, a powder for magnetic cores from which the powder magnetic core can be obtained, and methods of manufacturing them.

BACKGROUND ART

We are surrounded by a considerable number of products that utilize electromagnetism, such as transformers, motors, generators, speakers, inductive heaters, and various actuators. Many of these products utilize an alternating magnetic field and are usually provided with a magnetic core (soft magnet) in the alternating magnetic field in order to obtain a large alternating magnetic field locally and efficiently.

Magnetic cores are required not only to have high magnetic properties in an alternating magnetic field but also to have a less high-frequency loss (referred to as an "iron loss," hereinafter, regardless of the material of magnetic core) when used in an alternating magnetic field. Examples of the iron loss include an eddy-current loss, hysteresis loss, and residual loss, among which the eddy-current loss is important and should be reduced because it increases as the frequency of an alternating magnetic field increases.

As such magnetic cores, powder magnetic cores are researched and developed, which are obtained by compression molding of soft magnetic particles (constitutional particles of powder for magnetic cores) that are each coated with an insulating layer (film). The powder magnetic cores are used in various electromagnetic devices because the insulating layers lie between the soft magnetic particles thereby to achieve a high specific resistance, low iron loss, and high degree of freedom in the shape. In recent years, to expand the uses of powder magnetic cores, enhancement of the strength is focused on together with the specific resistance. Descriptions regarding such powder magnetic cores are found in the patent literature below, etc.

CITATION LIST

Patent Literature

[PTL 1]
JP2003-243215A
[PTL 2]
JP2006-233268A
[PTL 3]
JP2013-171967A

SUMMARY OF INVENTION

Technical Problem

Patent Literature 1 describes a powder magnetic core comprising: Fe—Si-based soft magnetic particles each having a surface on which a nitrided layer is formed; and an insulating binding agent (binder) that comprises a silicone resin or the like. The nitrided layer comprises silicon nitride and is formed to suppress diffusion of the insulating material (such as a silicone resin) into the soft magnetic particles during the annealing at a high temperature ([0013], etc). The powder magnetic core is manufactured, for example, through mixing and kneading a powder of Fe-4Si-3Al (wt %) and a silicone resin to obtain a compound, pressurizing the compound to form a compact, and heating the compact in $N_2$ at a temperature of 800 degrees C. for 30 minutes to perform nitriding treatment and annealing treatment ([0019], Sample 15 in Table 1).

In the case of the powder magnetic core obtained by such a manufacturing method, however, the insulating property and binding strength between the soft magnetic particles tend to be insufficient after all because the annealing temperature is higher than the heat-resistant temperature of the silicone resin or the like as the insulating material. Thus, the manufacturing method as disclosed in Patent Literature 1 appears to be unable to form homogeneous or uniform nitrided layers between the soft magnetic particles.

Patent Literature 2 describes that a gas-atomized powder (Fe—Cr—Al) stored in a container of SUS 316 (oxidizable container) is heated to 1,000 degrees C. in the air (nitrogen-containing atmosphere) thereby to obtain a magnetic powder comprising particles that each have a surface coated with an AlN-based film of a high electric resistance ([0022], [0023], etc). Patent Literature 2 also describes that Cr contained in the powder is essential to formation of the AlN-based film and, when Cr is not contained, Fe nitride is generated ([0011]).

When the Fe—Cr—Al powder is heated in the air as in Patent Literature 2, a certain amount of oxide film will ordinarily be formed on the surface of each particle and the AlN is quite unlikely to be formed homogeneously on the surface of each particle. It is to be noted that Patent Literature 2 relates to a powder for magnetic cores and does not involve any specific proposal regarding the specific resistance and strength of the powder magnetic core.

Patent Literature 3 describes that a compact, which comprises a gas-atomized powder (Fe-6.5 wt % Si) subjected to insulating treatment using $SiO_2$, is heated by microwaves (annealing treatment) in a nitrogen-containing atmosphere thereby to obtain a powder magnetic core comprising particles that each have a surface coated with a nitride. However, this nitride is apparently a Si-based nitride rather than AlN, which will be described later, and nothing in Patent Literature 3 describes matters regarding a low-melting-point glass.

The present invention has been made in view of such circumstances and an object of the present invention is to provide a novel powder magnetic core of which the specific resistance and strength can be stably enhanced. Another object of the present invention is to provide a method of manufacturing such a powder magnetic core as well as a powder for magnetic cores that is suitable for manufacturing of the powder magnetic core and a method of manufacturing the powder for magnetic cores.

Solution to Problem

As a result of intensive studies to achieve the above objects and repeating trial and error, the present inventors have newly found that a powder magnetic core comprising soft magnetic particles each having a first coating layer of aluminum nitride and a second coating layer of a low-melting-point glass at the grain boundary can stably develop more excellent specific resistance and strength than those of the prior art. Developing this achievement, the present inventors have accomplished the present invention as will be described hereinafter.

«Powder Magnetic Core»

The powder magnetic core of the present invention is characterized by comprising: soft magnetic particles; a first coating layer that coats a surface of each of the soft magnetic particles and comprises aluminum nitride; and a second coating layer that coats at least a part of a surface of the first coating layer and comprises a low-melting-point glass having a softening point lower than an annealing temperature for the soft magnetic particles.

In the case of the powder magnetic core of the present invention, the first coating layer comprising aluminum nitride as a ceramic (which may be referred to as an "AlN layer") is excellent in the insulating property and heat resistance. Therefore, even when the high-temperature annealing is performed to remove the residual strain or the like which is introduced into the soft magnetic particles during the molding, the first coating layer is less likely to degrade and cause defects and exhibits high insulating property to prevent the short-circuiting between adjacent soft magnetic particles. If, hypothetically, defects such as cracks occur in the first coating layer, the insulating property between the soft magnetic particles can be maintained by the second coating layer which comprises a low-melting-point glass and coats the surface of the first coating layer. Thus, the powder magnetic core of the present invention can exhibit a high specific resistance owing to the first coating layer and second coating layer acting synergistically.

Moreover, the low-melting-point glass which is softened or melted during the annealing has good wettability to the AlN layer and uniformly wets the AlN layer to spread thereon. Therefore, the powder magnetic core of the present invention can be in a state in which even fine gaps between the soft magnetic particles (such as triple junctions) are filled with the low-melting-point glass, and air spaces and the like to be origins of fracture are unlikely to occur. Consequently, the second coating layer comprising a low-melting-point glass (which may also be referred to as a "low-melting-point glass layer") can act, in cooperation with the first coating layer, to enhance the insulating property between adjacent soft magnetic particles and strongly bond adjacent soft magnetic particles to one another.

Thus, the first coating layer and the second coating layer act in a synergistic manner thereby to allow the powder magnetic core of the present invention to exhibit high magnetic properties (such as low coercivity and low hysteresis loss) while having both the excellent specific resistance and strength at high levels.

In the case of the powder magnetic core of the present invention, although the reason is not known, diffusion of each constitutional element hardly occurs between the low-melting-point glass and the soft magnetic particles even after the high-temperature annealing. That is to say, the AlN layer existing therebetween acts as if it is a barrier layer to suppress the degradation and deterioration of the low-melting-point glass. It appears that such an action of the AlN layer also contributes to enhancement of the specific resistance and strength of the powder magnetic core.

«Powder for Magnetic Cores»

The present invention can also be perceived as a powder for magnetic cores that is suitable for manufacturing of the above-described powder magnetic core. That is, the present invention may also be a powder for magnetic cores, the powder being characterized by comprising: soft magnetic particles; an insulating layer (AlN layer) that coats a surface of each of the soft magnetic particles and comprises aluminum nitride; and a low-melting-point glass that is attached onto the insulating layer and has a softening point lower than an annealing temperature for the soft magnetic particles. This powder for magnetic cores is suitable for manufacturing of the above-described powder magnetic core.

In the present description, the soft magnetic particles each provided with the insulating layer (AlN layer) on which the low-melting-point glass is attached may be referred to as "particles for magnetic cores." An aggregate of the particles for magnetic cores is to be the powder for magnetic cores of the present invention. Existence form of the low-melting-point glass in the particles for magnetic cores is not limited. For example, the low-melting-point glass may be attached onto the insulating layer, as fine glass particles having a smaller particle diameter than that of the soft magnetic particles, or as a film-like or layer-like form that coats the insulating layer. These apply to the method of manufacturing a powder for magnetic cores.

In any event, it may suffice that the low-melting-point glass is softened and further melted when a compact of the powder for magnetic cores (powder magnetic core) is annealed, so that the first coating layer comprising aluminum nitride is formed to coat each of the soft magnetic particles and the second coating layer comprising a low-melting-point glass is formed on the first coating layer.

«Method of Manufacturing Powder for Magnetic Cores»

The present invention can also be perceived as a method of manufacturing the above powder for magnetic cores. That is, the present invention may also be a method of manufacturing a powder for magnetic cores, the method being characterized by comprising an insulating layer forming step of heating soft magnetic particles to 800 to 1,300 degrees C. in an embodiment and 850 to 1,250 degrees C. in another embodiment in a nitriding atmosphere thereby to form an insulating layer on a surface of each of the soft magnetic particles, the soft magnetic particles comprising an iron alloy that contains at least Al, the insulating layer comprising aluminum nitride. The manufacturing method of the present invention may preferably further comprise a glass attaching step of attaching a low-melting-point glass to the surface of the insulating layer, the low-melting-point glass having a softening point lower than an annealing temperature for the soft magnetic particles.

«Method of Manufacturing Powder Magnetic Core»

The present invention can be perceived not only as the powder magnetic core but also as a method of manufacturing the same. That is, the present invention may be a method of manufacturing a powder magnetic core, the method being characterized by comprising: a filling step of filling a mold with the above-described powder for magnetic cores; a molding step of compression-molding the powder for magnetic cores in the mold; and an annealing step of annealing a compact obtained after the molding step, wherein the powder magnetic core is obtained with its excellent specific resistance or strength.

«Others»

(1) The "annealing temperature for the soft magnetic particles" as referred to in the present invention is specifically a heating temperature in the annealing step which is performed to remove the residual strain and residual stress from the compact obtained by compression-molding the powder for magnetic cores. A specific value of the annealing temperature is not limited, provided that the annealing temperature is higher than the softening point of a selected low-melting-point glass, but the annealing temperature may preferably be 650 degrees C. or higher in an embodiment, 700 degrees C. or higher in another embodiment, 800 degrees C. or higher in still another embodiment, and 850 degrees C. or higher in a further embodiment. On the other hand, the softening point of the low-melting-point glass may preferably be 800 degrees C. or lower in an embodiment, 750 degrees C. or lower in another embodiment, and 725 degrees C. or lower in a further embodiment. In contrast, the softening point may preferably be 350 degrees C. or higher in an embodiment, 375 degrees C. or higher in another embodiment, 500 degrees C. or higher in still another embodiment, and 570 degrees C. or higher in a further embodiment.

The "softening point" as referred to in the present invention is a temperature at which the viscosity of the heated low-melting-point glass comes to $1.0 \times 10^{7.5}$ dPa·s in the process of temperature rise. Therefore, the softening point as referred to in the present invention is not necessarily equal to a so-called glass-transition point (Tg). The softening point of a glass is specified in accordance with JIS R3103-1, Viscosity and viscometric fixed points of glass—Part 1: Determination of softening point.

(2) The AlN layer according to the present invention may comprise a perfect crystal structure and may also include an imperfect crystal structure and the atomic ratio of Al and N may not be strictly 1:1. It may suffice that the insulating property of the AlN layer is higher than that of the soft magnetic particle itself, and the specific resistance value is not limited.

The first coating layer may consist only of AlN, but may contain other substances than AlN to an extent that does not impair the above-described insulating property, heat resistance or wettability and other necessary properties. For example, the first coating layer may contain an oxide in addition to AlN. Such an oxide may be, for example, a compound of Al and O (which may be referred to as "Al—O"). The Al—O is considered to be, for example, any of aluminum (III) oxide as represented by alpha-$Al_2O_3$ or gamma-$Al_2O_3$, aluminum (II) oxide as represented by AlO, aluminum (I) oxide as represented by $Al_2O$, oxidized aluminum of which a part of O lacks, and the like, but it is not easy to generally specify or define the composition or structure. In the present description, the Al—O is also referred to as an "oxidized aluminum," regardless of its composition and structure.

The Al—O may exist inside the first coating layer, at the upper layer side (the second coating layer side) and/or at the lower layer side (the soft magnetic particle side) or may also be dispersed (distributed) across the whole area. The composition and structure of Al—O may be different in accordance with the location at which it exists. The amount of Al—O is not particularly limited, but a smaller amount of Al—O may be preferred if the Al—O is regarded as one of impurities contained in the first coating layer. When the soft magnetic particle coated with the first coating layer as a whole (the soft magnetic particle as a whole excluding the second coating layer) is 100 mass %, the amount of O may preferably be 0.3 mass % or less in an embodiment, 0.2 mass % or less in another embodiment, 0.1 mass % or less in still another embodiment, and 0.08 mass % or less in a further embodiment.

It is preferred that the first coating layer or second coating layer according to the present invention exists uniformly or homogeneously over the outer surface of every soft magnetic particle, but a portion of which a part is not coated or an ununiform or inhomogeneous portion may be allowed to exist. The second coating layer as referred to in the present invention can otherwise be called a grain boundary layer that lies between particles constituting the powder magnetic core.

(3) Unless otherwise stated, a numerical range "x to y" as referred to in the present description includes the lower limit x and the upper limit y. Numerical values included in various numerical values or numerical ranges described in the present description may be freely combined to constitute a new numerical range such as "a to b." Further, "alpha or more" and "beta or less" can be appropriately changed to "more than alpha" and "less than beta," respectively.

BRIEF DESCRIPTION OF DRAWINGS

FIG. 5C is an AES chart obtained when observing the vicinities of surfaces of soft magnetic particles (Sample 46) after nitriding treatment.

FIG. 5D is an AES chart obtained when observing the vicinities of surfaces of soft magnetic particles (Sample D6) after nitriding treatment.

DESCRIPTION OF EMBODIMENTS

Figure 1:
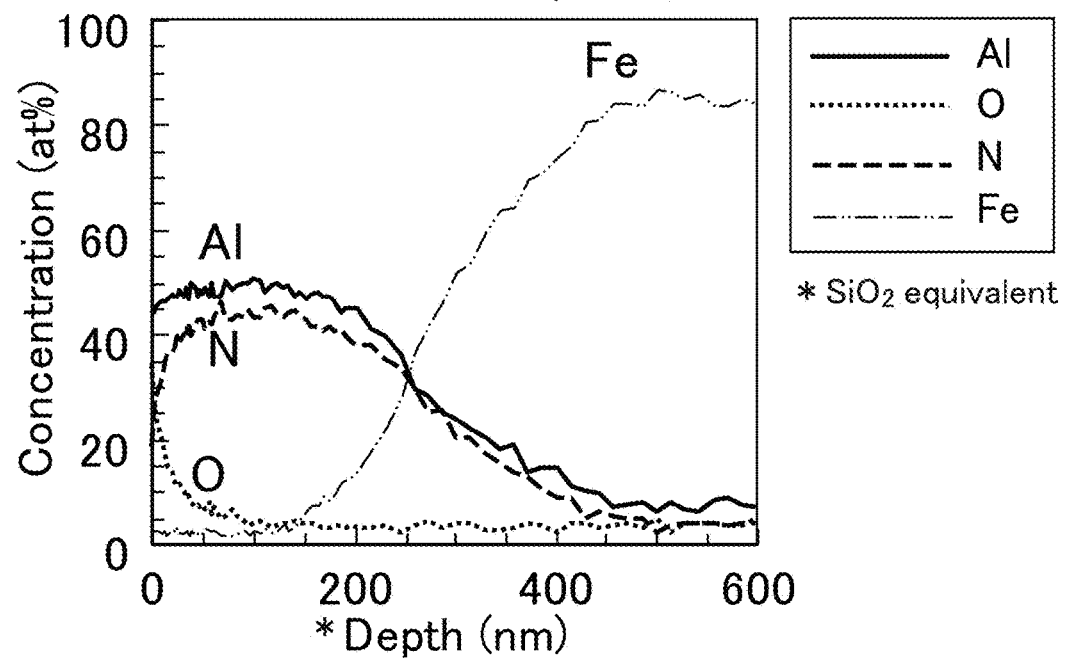
FIG. 1 is an AES chart obtained when observing the vicinities of surfaces of soft magnetic particles (Sample 12) after nitriding treatment.

The present invention will be described in more detail with reference to embodiments of the present invention. The contents described in the present description, including the embodiments below, can be applied not only to the powder magnetic core according to the present invention but also to a powder for magnetic cores that is used for the powder magnetic core and methods of manufacturing them. Therefore, one or more features freely selected from the present description can be added to the above-described features of the present invention. In a certain case (when there is a situation where it is impossible or utterly impractical to directly specify a "product" by its structure or characteristics (impossible/impractical circumstances) or the like), features regarding a production process can also be features regarding the "product" when understood as those in a productby-process. Best mode of the embodiments may be selected in accordance with objectives, required performance and other factors.

«Soft Magnetic Particles (Soft Magnetic Powder)»

It may suffice that the soft magnetic particles which constitute the soft magnetic powder contain ferromagnetic elements such as group VIII transition elements (Fe, Co, Ni, etc.) as primary components, but the soft magnetic particles may preferably comprise pure iron or iron alloy in view of the handling ability, availability, cost, and the like. Iron alloy may be preferred because iron alloy that contains Al (Al-containing iron alloy) allows easy formation of the insulating layer (first coating layer) comprising aluminum nitride. Further, iron alloy that contains Si may also be preferred because of increase in the electric resistivity of the soft magnetic particles, increase in the specific resistance (decrease in the eddy-current loss) or enhancement of the strength of the powder magnetic core, and the like. Moreover, when iron alloy contains Si together with Al, formation of the AlN layer may be easy, which is preferred.

Here, when the iron alloy according to the present invention contains Si, if the content of Si is unduly high, silicon nitride ($Si_3N_4$) will readily be formed on the surfaces of the soft magnetic particles preferentially to aluminum nitride, which may not be preferred. Therefore, in the iron alloy according to the present invention, an aluminum ratio that is a mass ratio of the content of Al to the total content of Al and Si (Al+Si) (i.e. Al/(Al+Si)) may preferably be 0.447 or more in an embodiment, 0.45 or more in another embodiment, 0.5 or more in still another embodiment, and 0.7 or more in a further embodiment. The upper limit of the Al ratio may preferably be 1 or less in an embodiment and 0.9 or less in another embodiment. In this case, when the iron alloy as a whole is 100 mass % (referred simply to as "%"), the total content of Al and Si may preferably be 10% or less in an embodiment, 6% or less in another embodiment, 5% or less in still another embodiment, and 4% or less in a further embodiment. The lower limit of the total content of Al and Si may preferably be 1% or more in an embodiment and 2% or more in another embodiment.

Specific composition of Al and Si in the iron alloy can be adjusted appropriately with consideration for the formability of the AlN layer, magnetic properties of the powder magnetic core, moldability of the powder for magnetic cores, and other factors. For example, when the iron alloy as a whole that constitutes the soft magnetic particles is 100%, the content of Al may preferably be 0.5% to 6% in an embodiment, 1% to 5% in another embodiment, and 1.2% to 3% in a further embodiment, and the content of Si may preferably be 0.01% to 5% in an embodiment, 1% to 3% in another embodiment, and 1.2% to 2.5% in a further embodiment. If the content of Al or Si is unduly low, the above-described effects will be small, while an unduly high content of Al or Si will lead to deterioration in the magnetic properties and moldability of the powder magnetic core, increase in cost, etc., which may not be preferred.

The balance of the iron alloy according to the present invention is primarily Fe, but the iron alloy can contain one or more modifying elements that can improve the generating ability of AlN, magnetic properties and specific resistance of the powder magnetic core, moldability of the powder for magnetic cores, etc., as the balance other than Fe and incidental impurities. Possible examples of such modifying elements include Mn, Mo, Ti, Ni, and Cr. In general, the amount of modifying elements is very small and the total amount thereof may preferably be 2% or less in an embodiment and 1% or less in another embodiment.

The particle diameter of the soft magnetic particles is not limited, but in general may preferably be 10 to 300 micrometers in an embodiment and 50 to 250 micrometers in another embodiment. An unduly large particle diameter leads to decrease in the specific resistance or increase in the eddy-current loss while an unduly small particle diameter leads to increase in the hysteresis loss, etc., which may not be preferred. Unless otherwise stated, the particle diameter of particles as referred to in the present description is defined in accordance with a particle size that is determined by a sieving method for classification using sieves of predetermined mesh sizes.

Method of manufacturing raw material particles to be the soft magnetic particles or raw material powder as an aggregate thereof is not limited insofar as the above-described powder magnetic core of the present invention can be obtained. It is to be noted, however, that the amount of oxygen contained in the soft magnetic particles (oxygen concentration) can vary, such as due to influence by the method of manufacturing raw material powder. In particular, O may be able to inevitably attach as oxide or the like to the surfaces of soft magnetic particles, even without intention of including O therein. The first coating layer can readily be formed and the powder magnetic core excellent in the specific resistance and strength can be obtained even when the amount of oxygen existing on the surfaces of soft magnetic particles before the coating treatment (i.e. the surfaces of raw material particles) is small or large insofar as it is not unduly large.

Therefore, the soft magnetic particles (soft magnetic powder) according to the present invention may preferably comprise raw material particles (raw material powder) of which the oxygen concentration at the particle surface is 0.3% or less in an embodiment, 0.2% or less in another embodiment, 0.1% or less in still another embodiment, 0.08% or less in yet another embodiment, 0.07% or less in a further embodiment, and 0.06% or less in a still further embodiment. The oxygen concentration as referred to in the present description is specified as below and defined as a value when the raw material powder as a whole before the coating treatment (the raw material particles as a whole as the measurement object) is 100 mass %.

The oxygen concentration as referred to in the present description is specified using an infrared absorption method (infrared spectroscopy: IR). Specifically, the above-described oxygen concentration is specified through heating/melting the raw material particles (a part of the raw material powder) as the sample of measurement object in an inert gas (He) atmosphere, extracting CO generated, and detecting the generated CO using a detector to quantify it.

When the raw material powder to be the soft magnetic particles is an atomized powder comprising pseudo-spherical particles, mutual aggression between the particles may be low, so that the decrease in the specific resistance can be suppressed, which may be preferred. The atomized powder may be a gas-atomized powder that is obtained by atomizing a molten raw material into an inert gas atmosphere, such as $N_2$ or Ar, or may also be a gas-water-atomized powder that is obtained by water cooling after atomizing a molten raw material. In addition to oxygen contained in the atomizing atmosphere of the atomized powder, water that is a cooling medium for the atomized particles appears to be an oxygen source. Therefore, when the gas-atomized powder is used, the oxygen concentration at the surfaces of the soft magnetic particles can be more reduced. When the gas-water-atomized powder is used, the raw material cost for the powder for magnetic cores or powder magnetic core can be reduced.

The soft magnetic powder according to the present invention may comprise a single type of powder or may also be a mixture of plural types of powders of which the particle size, manufacturing method or composition is different.

«Low-Melting-Point Glass»

The low-melting-point glass according to the present invention may preferably be selected as a low-melting-point glass that has an appropriate composition, with consideration for the specific resistance, strength, annealing temperature and the like which are required for the powder magnetic core. The low-melting-point glass according to the present invention may preferably be a low-melting-point glass that has a composition with small environmental load, such as a silicate-based glass, borate-based glass, borosilicate-based glass, vanadium oxide-based glass and phosphate-based glass, rather than a lead borosilicate-based glass.

More specifically, examples of the silicate-based glass include those of which the primary component is, for example, $SiO_2$—$ZnO$, $SiO_2$—$Li_2O$, $SiO_2$—$Na_2O$, $SiO_2$—$CaO$, $SiO_2$—$MgO$, $SiO_2$—$Al_2O_3$ or the like. Examples of bismuth silicate-based glass include those of which the primary component is, for example, $SiO_2$—$Bi_2O_3$—$ZnO$, $SiO_2$—$Bi_2O_3$—$Li_2O$, $SiO_2$—$Bi_2O_3$—$Na_2O$, $SiO_2$—$Bi_2O_3$—$CaO$ or the like. Examples of the borate-based glass include those of which the primary component is, for example, $B_2O_3$—$ZnO$, $B_2O_3$—$Li_2O$, $B_2O_3$—$Na_2O$, $B_2O_3$—$CaO$, $B_2O_3$—$MgO$, $B_2O_3$—$Al_2O_3$ or the like. Examples of the borosilicate-based glass include those of which the primary component is, for example, $SiO_2$—$B_2O_3$—$ZnO$, $SiO_2$—$B_2O_3$—$Li_2O$, $SiO_2$—$B_2O_3$—$Na_2O$, $SiO_2$—$B_2O_3$—$CaO$, $SiO_2$—$B_2O_3$—$Na_2O$—$Al_2O_3$ or the like. Examples of the vanadium oxide-based glass include those of which the primary component is, for example, $V_2O_5$—$B_2O_3$, $V_2O_5$—$B_2O_3$—$SiO_2$, $V_2O_5$—$P_2O_5$, $V_2O_5$—$B_2O_3$—$P_2O_5$ or the like. Examples of the phosphate-based glass include those of which the primary component is, for example, $P_2O_5$—$Li_2O$, $P_2O_5$—$Na_2O$, $P_2O_5$—$CaO$, $P_2O_5$—$MgO$, $P_2O_5$—$Al_2O_3$ or the like. The low-melting-point glass according to the present invention can appropriately contain one or more of $SiO_2$, $ZnO$, $Na_2O$, $B_2O_3$, $Li_2O$, $SnO$, $BaO$, $CaO$, $Al_2O_3$ and the like in addition to the above-described components.

The low-melting-point glass may preferably be contained at 0.1 to 5 mass % in an embodiment, 0.2 to 3.6 mass % in another embodiment, and 1 to 4 mass % in a further embodiment, when the powder for magnetic cores as a whole or the powder magnetic core as a whole is 100 mass %. If the content of the low-melting-point glass is unduly low, a sufficient second coating layer will not be formed and a powder magnetic core having a high specific resistance and high strength cannot be obtained. On the other hand, an unduly high content thereof may deteriorate the magnetic properties of the powder magnetic core.

The low-melting-point glass in the powder for magnetic cores (low-melting-point glass before the annealing) may also be in a state in which, for example, fine particles of the low-melting-point glass of which the particle diameter is smaller than that of the soft magnetic particles are scattered on the surfaces of insulating layers of the soft magnetic particles. The particle diameter of such a low-melting-point glass (fine glass particles) is determined in accordance with the particle diameter of the soft magnetic particles, but may preferably be 0.1 to 100 micrometers in an embodiment and 0.5 to 50 micrometers in another embodiment. If the particle diameter of the fine glass particles is unduly small, the manufacturing and handling will be difficult, while if the particle diameter is unduly large, formation of uniform second coating layers will be difficult. Examples of the method for specifying the particle diameter of fine glass particles include a dry method, wet method, method of obtaining the particle diameter from a scatter pattern of laser light with which the fine glass particles are irradiated, method of obtaining the particle diameter from the difference in sedimentation rate, and method of obtaining the particle diameter by image analysis. In the present description, the particle diameter of the fine glass particles is specified by the image analysis using a scanning-type electron microscope (SEM).

«Insulating Layer Forming Step»

The insulating layer forming step is a step of forming insulating layers (first coating layers) comprising aluminum nitride on the surfaces of the soft magnetic particles. Various methods can be considered as a method of forming the insulating layers, but as described above, uniform insulating layers (AlN layers) can be formed on the surfaces of the soft magnetic particles by heating the soft magnetic particles, which comprise an iron alloy that contains at least Al, at 800 degrees C. or higher in a nitriding atmosphere. The AlN layers thus obtained have high insulating property even with a thin thickness and excellent wettability with the low-melting-point glass. The heating temperature for the soft magnetic particles may more preferably be 800 to 1,300 degrees C. in an embodiment, 820 to 1,270 degrees C. in another embodiment, and 850 to 1,250 degrees C. in a further embodiment.

This heating temperature may also be adjusted in accordance with the previously-described oxygen concentration at the surfaces of the soft magnetic particles. For example, when the oxygen concentration is high, it is preferred to increase the heating temperature. On the other hand, when the oxygen concentration is low, the heating temperature may be high or may also be low. As an example, when the oxygen concentration is 0.08% or higher (or higher than 0.08%) in an embodiment, 0.09% or higher (or higher than 0.09%) in another embodiment, and 0.1% or higher (or higher than 0.1%) in a further embodiment, the heating temperature may preferably be 900 to 1,300 degrees C. in an embodiment, 950 to 1,250 degrees C. in another embodiment, and 980 to 1,230 degrees C. in a further embodiment. In contrast, when the oxygen concentration is 0.1% or lower (or lower than 0.1%) in an embodiment, 0.09% or lower (or lower than 0.09%) in another embodiment, and 0.08% or lower (or lower than 0.08%) in a further embodiment, the heating temperature may suffice to be adjusted within the above-described range (800 to 1,300 degrees C.), but the heating temperature may also be particularly low, such as 800 to 1,050 degrees C. in an embodiment, 820 to 1,000 degrees C. in another embodiment, and 850 to 950 degrees C. in a further embodiment. Thus, the heating temperature during the insulating layer forming step may be appropriately selected in accordance with the type of raw material powder (oxygen concentration) thereby to allow for both the stable formation of the insulating layers and the high production efficiency.

Various atmospheres may be considered as the nitriding atmosphere, but a nitrogen ($N_2$) atmosphere may be preferred, for example. The nitrogen atmosphere may be a pure nitrogen gas atmosphere or may also be a mixed gas atmosphere of nitrogen gas and inert gas (such as $N_2$ and Ar). In an alternative embodiment, the nitriding atmosphere may be an ammonia gas ($NH_3$) atmosphere or the like. To maintain a fixed nitrogen concentration during the nitriding step, the nitriding atmosphere may preferably be a flowinggas atmosphere. The oxygen concentration in the nitriding atmosphere may preferably be 0.1 vol % or less.

The heating time may be determined in accordance with the nitrogen concentration in the nitriding atmosphere and the heating temperature, but the efficiency can be high when the heating time is, for example, 0.5 to 10 hours in an embodiment and 1 to 3 hours in another embodiment. The thickness (layer thickness) of the insulating layers may be adjusted in accordance with the spec of the powder magnetic core. The layer thickness can be adjusted by controlling the heating time or the heating temperature. In particular, when the heating temperature is a relatively high temperature, the layer thickness tends to be large.

«Glass Attaching Step»

The glass attaching step is a step of attaching the low-melting-point glass onto the insulating layers formed on the surfaces of the soft magnetic particles. For example, when attaching fine particles comprising a low-melting-point glass (fine glass particles), the glass attaching step may be a wet process or may also be a dry process. When employing the wet process, for example, the glass attaching step can be a wet-attaching step of mixing the fine glass particles and the soft magnetic particles after the insulating layer forming step in a dispersion medium and then drying them. When employing the dry process, the glass attaching step can be a dry-attaching step of mixing the fine glass particles and the soft magnetic particles after the insulating layer forming step without using a dispersion medium. When the wet process is employed, the fine glass particles may be readily and uniformly attached to the insulating layer surfaces of the soft magnetic particles. When the dry process is employed, the efficiency is high because the drying step can be omitted.

It may be sufficient for the low-melting-point glass to soften or melt when a compact of the powder for magnetic cores (which may be referred to as a "powder magnetic core," including this compact, in the present description) is annealed. Note, however, that the present invention does not exclude a case in which the low-melting-point glass softens or melts when the powder for magnetic cores is prepared.

«Manufacturing of Powder Magnetic Core»

The powder magnetic core of the present invention can be obtained through a filling step of filling a mold having a cavity of a desired shape with the powder for magnetic cores, a molding step of compression-molding the powder for magnetic cores into a compact, and an annealing step of annealing the compact. Here, the molding step and the annealing step will be described.

(1) Molding Step

Molding pressure applied to the soft magnetic powder during the molding step is not limited, but high-pressure molding allows the obtained powder magnetic core to have a high density and high magnetic flux density. A mold lubrication warm high-pressure molding method is known as the high-pressure molding method. The mold lubrication warm high-pressure molding method comprises a filling step of filling a mold, in which a higher fatty acid-based lubricant is applied to the inner surface, with a powder for magnetic cores and a warm high-pressure molding step of performing pressure molding at a molding temperature and molding pressure at which a metal soap film other than the higher fatty acid-based lubricant is generated between the powder for magnetic cores and the mold.

The term "warm" as used herein refers to setting the molding temperature, for example, at 70 to 200 degrees C. in an embodiment and 100 to 180 degrees C. in another embodiment with consideration for the influence to the surface film (insulating film), the degradation of the higher fatty acid-based lubricant, etc. Details of the mold lubrication warm high-pressure molding method are described in various publications including JP3309970B and JP4024705B. According to this mold lubrication warm high-pressure molding method, ultrahigh-pressure molding is possible while prolonging the mold life and a powder magnetic core of high density can readily be obtained.

(2) Annealing Step

The annealing step is performed for removing the residual strain and residual stress, which are introduced into the soft magnetic particles during the molding step, to reduce the coercivity and hysteresis loss of the powder magnetic core. The annealing temperature can be appropriately selected in accordance with the types of the soft magnetic particles and low-melting-point glass, but may preferably be 650 degrees C. or higher in an embodiment, 700 degrees C. or higher in another embodiment, 800 degrees C. or higher in still another embodiment, and 850 degrees C. or higher in a further embodiment. Since the insulating layers according to the present invention are excellent in the heat resistance, the high insulating property and high barrier property can be maintained even after the high temperature annealing. However, excessive heating is unnecessary and can deteriorate the properties of the powder magnetic core and therefore the annealing temperature may preferably be 1,000 degrees C. or lower in an embodiment, 970 degrees C. or lower in another embodiment, and 920 degrees C. or lower in a further embodiment. The heating time may suffice to be, for example, 0.1 to 5 hours in an embodiment and 0.5 to 2 hours in another embodiment and the heating atmosphere may preferably be an inert gas atmosphere (including a nitrogen atmosphere).

«Powder Magnetic Core»

(1) Coating Layers

The thickness (film thickness) of the first coating layers or second coating layers according to the present invention is not limited, but if it is unduly small, the specific resistance and strength of the powder magnetic core cannot be sufficiently enhanced, while if it is unduly large, the magnetic properties of the powder magnetic core may deteriorate.

The thickness of the first coating layer (AlN layer) may preferably be, for example, 0.05 to 2 micrometers in an embodiment, 0.1 to 1 micrometer in another embodiment, and 0.2 to 0.6 micrometers (200 to 600 nanometers) in a further embodiment. The thickness of the second coating layer may preferably be, for example, 0.5 to 10 micrometers in an embodiment and 1 to 5 micrometers in another embodiment. Each layer (each coating layer) may ideally be formed on each of the soft magnetic particles, but may also be formed partially on a block that comprises several particles.

(2) Detailed properties of the powder magnetic core according to the present invention are not limited, but high magnetic properties can be obtained, for example, when the density ratio, which is a ratio of the bulk density (rho) of the powder magnetic core to the true density (rho0) of the soft magnetic particles (rho/rho0), may preferably be 85% or more in an embodiment, 95% or more in another embodiment, and 97% or more in a further embodiment.

The specific resistance of the powder magnetic core, which is a specific value that is possessed by each powder magnetic core and does not depend on its shape, may preferably be, for example, $10^2$ microohm·m or more in an embodiment, $10^3$ microohm·m or more in another embodiment, $10^4$ microohm·m or more in still another embodiment, and $10^5$ microohm·m or more in a further embodiment. Higher strength of the powder magnetic core may be preferred because the uses thereof are expanded. The bending strength of the powder magnetic core may preferably be, for example, 50 MPa or more in an embodiment, 80 MPa or more in another embodiment, and 100 MPa or more in a further embodiment.

(3) Use Application

The form of the powder magnetic core of the present invention is not limited, and it can be utilized in various electromagnetic devices, such as motors, actuators, transformers, inductive heaters (IH), speakers, and reactors. Specifically, the powder magnetic core of the present invention may preferably be used as an iron core that constitutes the field core or armature of a motor or generator. Among other things, the powder magnetic core of the present invention may preferably be used as an iron core for driving motors that is required to have a low loss and high output (high magnetic flux density). Driving motors may be used in vehicles such as cars.

The aluminum nitride (first coating layer) according to the present invention has a high coefficient of thermal conductivity and is thus excellent in the heat dissipation properties. Therefore, when the powder magnetic core of the present invention is used as an iron core of a motor or the like, for example, the heat generated due to the eddy-current and the like in the iron core or in a coil provided around the iron core can readily be conducted and dissipated into the external.

EXAMPLES

Example 1: Powder for Magnetic Cores

First, various powders for magnetic cores were produced by changing the component composition of soft magnetic powder and the nitriding treatment condition (temperature). Then, the vicinities of surfaces of the powder particles thus obtained were observed using a method of Auger electron spectroscopy analysis (AES) or X-ray diffraction (XRD). The contents thereof will be specifically described below.

<Production of Samples>

(1) Soft Magnetic Powder (Raw Material Powder)

Gas-atomized powders comprising five types of iron alloys of different component compositions as listed in Table 1 were prepared as raw material powders to be soft magnetic particles. Each gas-atomized powder was produced through atomizing a molten raw material into a nitrogen gas atmosphere using nitrogen gas and cooling it in the nitrogen gas atmosphere. Oxygen concentrations of the gas-atomized powders are also listed in Table 1. Method of specifying the oxygen concentration is as described previously.

Each soft magnetic powder was classified using sieves of predetermined mesh sizes and an electromagnetic vibratory sieve shaker (available from Retsch). In the present example, also as listed in Table 1, the particle size of each soft magnetic powder was "−180." The powder particle size "x-y" as referred to in the present description means that the raw material powder is composed of soft magnetic particles of a size that do not pass through a sieve having a sieve opening of x (micrometers) but pass through a sieve having a sieve opening of y (micrometers). The powder particle size "−y" means that the raw material powder is composed of soft magnetic particles of a size that pass through a sieve having a sieve opening of y (micrometers). Note that confirmation using SEM has been made that soft magnetic particles of a particle size of less than 5 micrometers are not included in any of the soft magnetic powders (here and hereinafter).

(2) Nitriding Treatment Step (Insulating Layer Forming Step)

Each soft magnetic powder was put into a heat treatment furnace and the nitriding treatment (heating) under the condition as listed in Table 1 was performed in a nitrogen atmosphere in which nitrogen gas ($N_2$) was flowing at a rate of 0.5 L/min. Soft magnetic powders were thus obtained after the nitriding treatment (Samples 11 to 16).

<Observation of Samples>

(1) Auger electron spectroscopy analysis (AES) was performed for powder particles extracted arbitrarily from Sample 12 to analyze the component composition in the vicinity of the surface (range from the outermost surface to a depth of 600 nm) of each particle. Profiles are illustrated in FIG. 1.

(2) Vicinities of the surfaces of powder particles extracted arbitrarily from each sample as listed in Table 1 were analyzed by X-ray diffraction (XRD). Profiles thus obtained are illustrated together in FIG. 2. The XRD was conducted using an X-ray diffractometer (D8 ADVANCE available from Bruker AXS K.K.) with a tube of Fe-Kalpha and 2-theta of 30 to 50 degrees under a condition of 0.021 deg/step and 9 step/sec.

<Evaluation of Samples>

(1) As apparent from FIG. 1, it has been revealed that an AlN layer (insulating layer, first coating layer) having a thickness of about 300 to 400 nm is formed in the vicinity of the surface of soft magnetic particle. In the vicinity of the outermost surface (depth of about 10 nm), a slight amount of O is detected, which may be originated from a natural oxide film generated after the nitriding treatment (insulating layer forming step). As will be understood, such a powder in which a natural oxide film is present on the particle surface falls under the powder for magnetic cores of the present invention.

Figure 2:
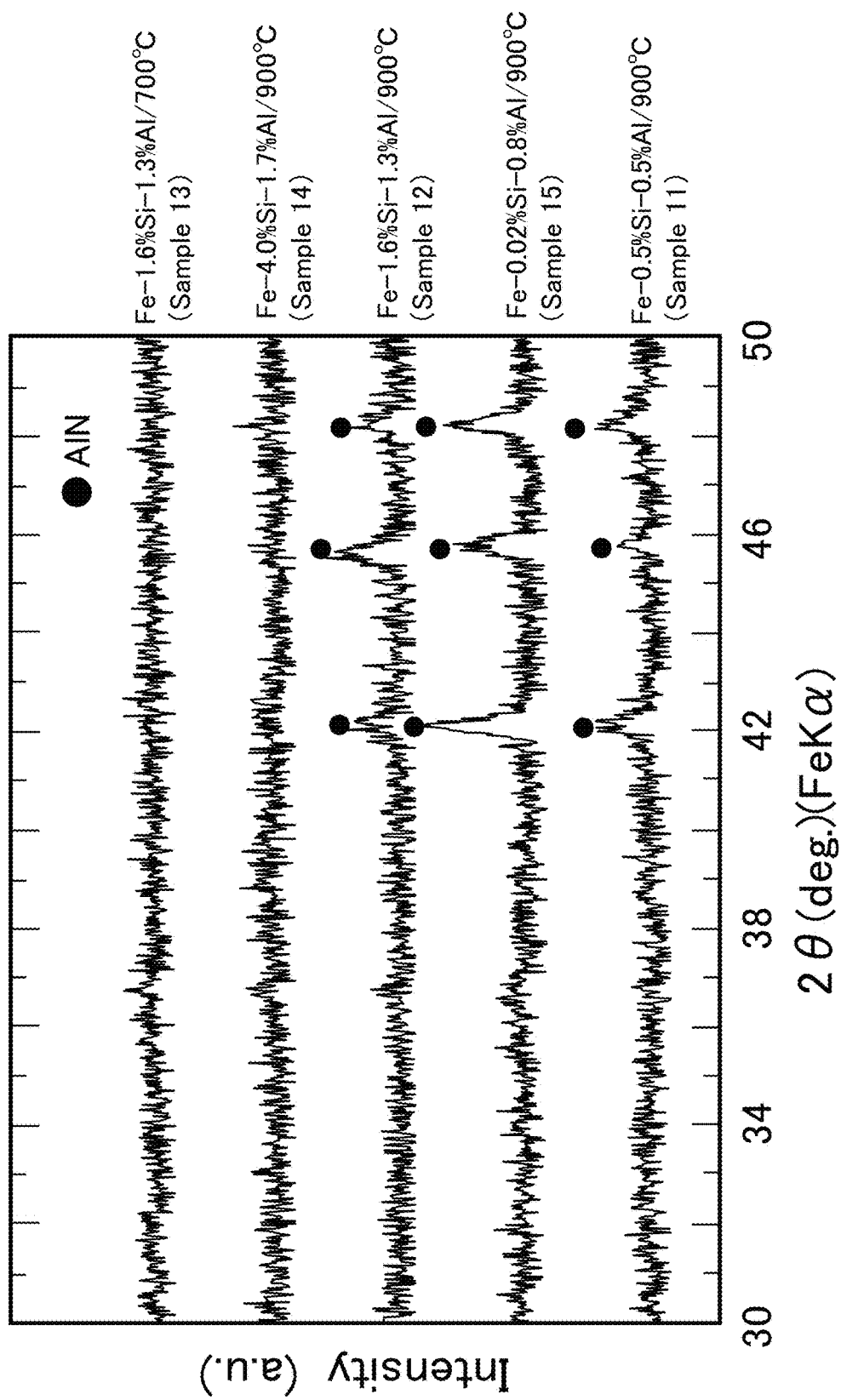
FIG. 2 is a set of XRD profile charts representing the vicinities of surfaces of soft magnetic particles after nitriding treatment.

(2) As apparent from the diffraction peaks of each profile illustrated in FIG. 2, it is found that the AlN layers are formed even on the surfaces of the soft magnetic particles (Sample 11) in which the Al content is small and the soft magnetic particles (Samples 15 and 16) in which Si is scarcely contained. On the other hand, it is found that the AlN layers are not formed on the surfaces of the soft magnetic particles (Sample 14) in which a large amount of both Al and Si is contained. It has thus been confirmed that the AlN layers are difficult to be formed as the Al ratio, which is a relative ratio of the Al amount, decreases.

It has also been confirmed that, even though the component composition of the soft magnetic particles is the same, there are a case in which the AlN layers are formed (Sample 12) and a case in which the AlN layers are not formed (Sample 13), depending on the nitriding treatment temperature. It has thus become apparent that, in order for the AlN layers to be stably formed, the nitriding treatment may preferably be performed at a relatively high temperature of about 800 degrees C. or higher in an embodiment and about 1,000 degrees C. or higher in another embodiment.

Example 2: Powder Magnetic Core

In the present example, various powder magnetic cores were produced with consideration for the results of Example 1 and the specific resistance and bending strength of each product were measured/evaluated. The contents thereof will be specifically described below.

<Production of Powder for Magnetic Cores>
(1) Soft Magnetic Powder (Raw Material Powder)

Plural gas-atomized powders of different component compositions or different particle sizes as listed in Table 2 were prepared as the soft magnetic particles. Production method and particle size adjustment for the gas-atomized powders are as described above.

(2) Nitriding Treatment Step (Insulating Layer Forming Step)

Each soft magnetic powder was put into a heat treatment furnace and the nitriding treatment (heating) under the condition as listed in Table 2 was performed in a nitriding atmosphere in which nitrogen gas ($N_2$) was flowing at a rate of 0.5 L/min. Soft magnetic powders were thus obtained after the nitriding treatment (Samples 21 to 31 and Samples C1 and C2). In the present description, a soft magnetic powder in which insulating layers are formed on the particle surfaces is referred to as an insulator-coated powder.

For comparison, there were also prepared an untreated soft magnetic powder for which the above-described nitriding treatment was not performed (Sample C3), soft magnetic powders for which oxidizing treatment was performed as substitute for the nitriding treatment (Samples C4 and C5), and a soft magnetic powder in which the particle surfaces were coated with a silicone resin as substitute for the nitriding treatment (Sample C6).

Oxidizing treatment (Sample C4) for forming insulating layers of oxidized silicon on the surfaces of the soft magnetic particles was performed by heating the raw material powder at 900 degrees C. for 3 hours in a hydrogen atmosphere in which the oxygen potential was adjusted. Oxidizing treatment (Sample C5) for forming insulating layers of oxidized iron on the surfaces of the soft magnetic particles was performed by heating the raw material powder at 750 degrees C. for 1 hour in a nitrogen atmosphere of an oxygen concentration of 10 vol %. Coating with the silicone resin was performed as below. First, a coating resin liquid was prepared by dissolving a commercially-available silicone resin ("YR3370" available from MOMENTIVE) in ethanol (solvent). The raw material powder was put into the coating resin liquid and mixed therewith and the ethanol was then volatilized. The residue thus obtained was heated to 250 degrees C. to cure the silicone resin. In this operation, the silicone resin amount was 0.2 mass % to the raw material powder as a whole. Such powders may also be referred simply to as insulator-coated powders.

(3) Glass Attaching Step

A low-melting-point glass was attached to particles of each of the above-described insulator-coated powders except Sample C1 in the following manner to produce a powder for magnetic cores. The type of the low-melting-point glass listed in Table 2 is either one of those listed in Table 3. In addition to the component composition of each low-melting-point glass, the softening point as referred to in the present description is also listed in Table 3.

(i) Preparation of Fine Glass Particles

Commercially-available glass frits having respective compositions as listed in Table 3 (D: available from Tokan Material Technology Co., Ltd., others: available from Nihon Horo Yuyaku Co., Ltd.) were prepared as the low-melting-point glasses. Each glass frit was put into the chamber of a wet mill (DYNO-MILL available from Shinmaru Enterprises Corporation) and the propeller for stirring was operated to finely mill the glass frit. The finely-milled ones were recovered and dried. Fine glass particles comprising each type of low-melting-point glass were thus obtained. The particle diameter (particle size) of all the obtained fine glass particles was smaller than that of the soft magnetic particles and the maximum particle diameter was about 5 micrometers. The particle diameter was confirmed by image analysis using a scanning-type electron microscope (SEM).

(ii) Dry Coating

The insulator-coated powder and the fine glass particle powder were stirred using a rotating ball mill. Caked powder after being stirred was pounded in a mortar. A powder for magnetic cores was thus obtained, comprising the insulator-coated particles having surfaces to which the fine glass particles were attached. Table 2 also lists the additive amount of the low-melting-point glass (fine glass particle powder) when the powder for magnetic cores as a whole is 100 mass %.

<Production of Powder Magnetic Core>
(1) Molding Step

A circular plate-like compact (outer diameter: phi 23 mm×thickness: 2 mm) was obtained by a mold lubrication warm high-pressure molding method using each powder for magnetic cores. During this operation, internal lubricant, resin binder and the like were not used at all. Specifically, each powder was molded as below.

A mold of superhard material having a cavity corresponding to a desired shape was prepared. This mold was preliminarily heated to 130 degrees C. using a band heater. Inner surface of this mold was preliminarily subjected to TiN coating treatment so that the surface roughness would be 0.4 z (ten-point average roughness, Rzjis).

Aqueous dispersion of lithium stearate (1%) was uniformly applied to the inner surface of the heated mold at a rate of about 10 $cm^3$/min using a spray gun. This aqueous dispersion was obtained by adding a surfactant and antifoam to water. Other details were along descriptions of JP3309970B and JP4024705B.

The mold having an inner surface to which the lithium stearate was applied was filled with each powder for magnetic cores (filling step) and warm molding was performed at 1,568 MPa while maintaining the mold at 130 degrees C. (molding step). During the warm molding, galling with the mold and other troubles did not occur on all the compacts, and the compacts were able to be pulled out from the mold with a low demolding pressure.

(2) Annealing Step

Each compact thus obtained was put into a heating furnace and heated for one hour in an atmosphere in which nitrogen gas was flowing at a rate of 8 L/min. The heating temperature (annealing temperature) at that time is also listed in Table 2. Various powder magnetic cores (samples) as listed in Table 2 were thus obtained.

Figure 3:
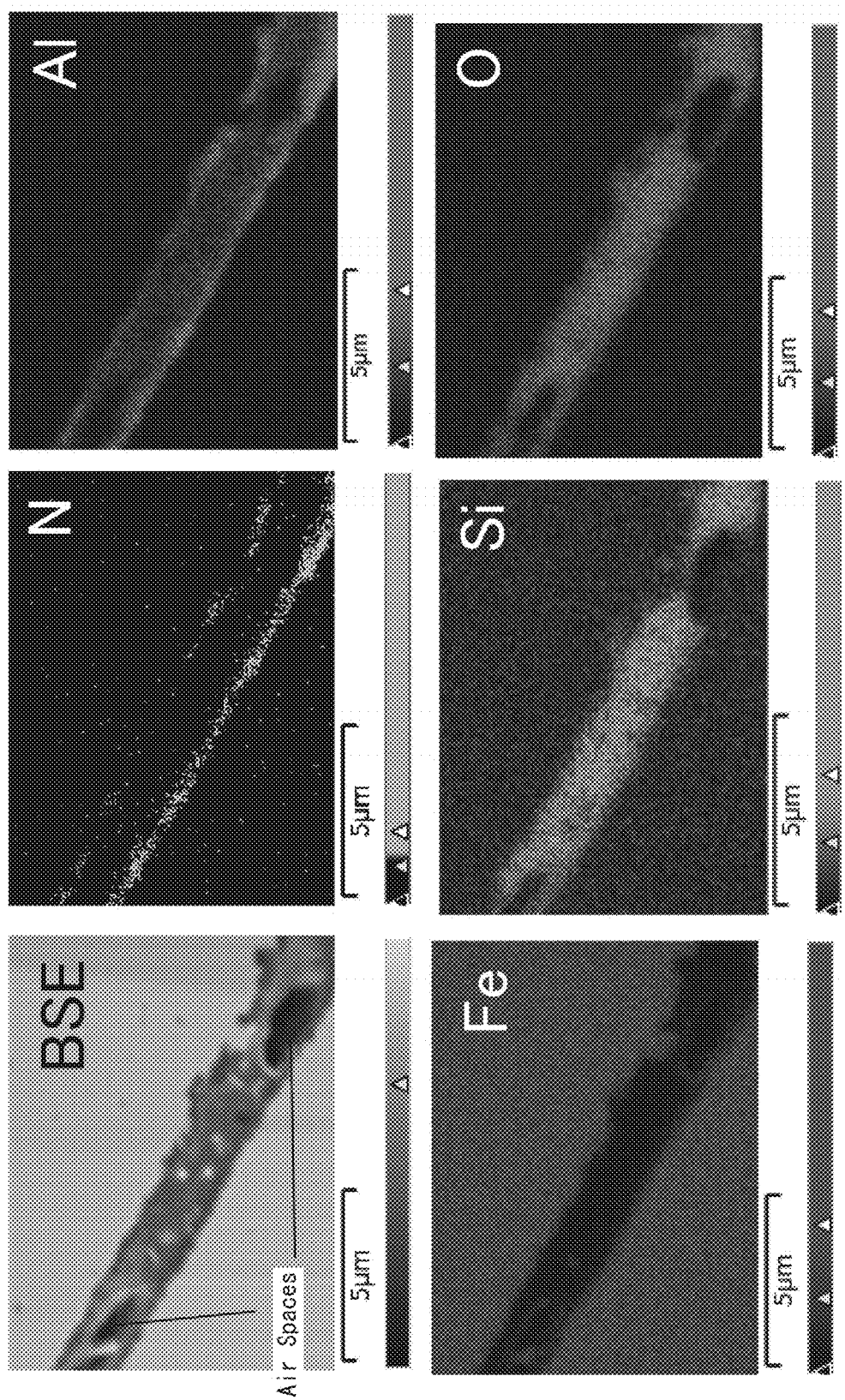
FIG. 3 depicts a BSE structural photograph representing a grain boundary of a powder magnetic core (Sample 23) and a set of structural photographs of mapping which represent distributions of respective elements that constitute the grain boundary.

<Observation/Measurement of Powder Magnetic Core>
(1) Grain boundary part (abutting part of soft magnetic particles) of each powder magnetic core was subjected to CP polishing (Cross-section Polishing) and observed using a scanning-type electron microscope (SEM, SU3500 available from Hitachi High-Technologies Corporation). As one example, FIG. 3 presents a back-scattered electron image (BSE structural photograph) of Sample 23 together with a set of distribution images of component elements (structural photographs of mapping) obtained by energy dispersive X-ray spectrometry (EDX) for Sample 23.

Figure 4:
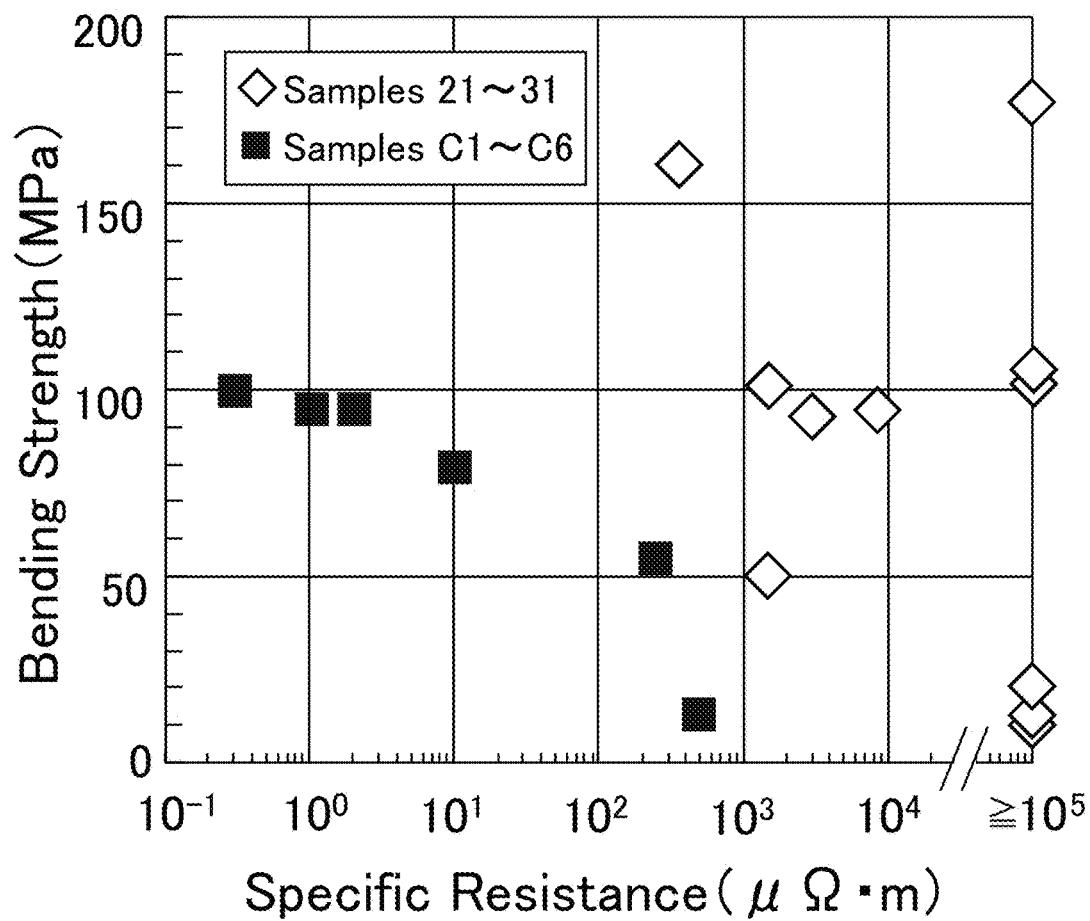
FIG. 4 is a dispersion diagram representing the relationship between a specific resistance and a bending strength of a powder magnetic core according to each sample.

(2) The specific resistance and bending strength of each powder magnetic core were obtained. The specific resistance was calculated from the electric resistance measured by a four-terminal method using a digital multimeter (model number: R6581, maker: ADC Corporation) and the volume obtained by actually measuring each sample. The bending strength was calculated from a three-point bending strength test for a circular plate-like sample. These results are also listed in Table 2. FIG. 4 illustrates a relationship between the specific resistance and bending strength of each sample. The "≥10⁵" presented in a column of the specific resistance of Table 2 represents that the specific resistance of a measurement sample is large and exceeds the measurement limit (over range).

«Evaluation of Powder Magnetic Core»

(1) Grain Boundary Structure

The following are found from FIG. 3 and Table 2. It has been confirmed that, in all samples of which the Al ratio and nitriding treatment condition fall within the ranges of the present invention, AlN layers (first coating layers) with concentrated Al and N are formed on the surfaces of the soft magnetic particles and low-melting-point glass layers (second coating layers) with concentrated Si and O are formed at the grain boundary parts thereof. Moreover, as apparent from FIG. 3, Fe which is the primary component of the soft magnetic particles does not diffuse to the grain boundary side, and Si and O which are primary components of the low-melting-point glass do not diffuse to the soft magnetic particle side. Therefore, it has also been confirmed that the AlN layers which cover the surfaces of the soft magnetic particles function as barrier layers for suppressing their diffusion.

(2) Properties

As apparent from FIG. 4 and Table 2, it has been revealed that all the powder magnetic cores (Samples 21 to 31) in which the surfaces of the soft magnetic particles are coated with the AlN layers and the low-melting-point glass is present at the grain boundary parts can exhibit a sufficient specific resistance and the bending strength corresponding thereto. In particular, in Samples 21 to 30 in which the soft magnetic particles contain an appropriate amount of Si, the specific resistance is large, and in Sample 31 in which the soft magnetic particles scarcely contain Si, the bending strength is large.

On the other hand, as found from Sample C1, when the AlN layers (first coating layers) are present, but the low-melting-point glass layers (second coating layers) are not present, the bending strength is considerably low even though the specific resistance is high. In contrast, as found from Sample C2 and Sample C3, when the low-melting-point glass layers are present, but the AlN layers are not present, the specific resistance is considerably low even though the bending strength is high.

In addition, as found from Sample C4 and Sample C5, when the first coating layers are oxide layers (Si—O-based layers or Fe—O-based layers), the bending strength is high owing to the second coating layers (low-melting-point glass layers), but the specific resistance is considerably low. This appears to be because the oxide layers present on the surfaces of the soft magnetic particles react with the low-melting-point glass, which is melted (softened) due to heating during the annealing, and degrade thereby to deteriorate the insulating property.

Furthermore, as found from Sample C6, when the first coating layers are silicone resin layers, both the specific resistance and bending strength are low regardless of the existence of the second coating layers (low-melting-point glass layers). This appears to be because the silicone resin layers degrade due to heating during the annealing thereby to deteriorate the insulating property and because the molten (softened) low-melting-point glass has so poor wettability to the silicone resin layers as to generate fine air spaces and the like to be origins of fracture.

From the above, it can be considered that the powder magnetic core of the present invention exhibits the high specific resistance and high strength even after the high temperature annealing, owing to the synergistic action of the AlN layers (first coating layers) and the low-melting-point glass layers (second coating layers).

Example 3: Powder for Magnetic Cores and Powder Magnetic Core

[Powder for Magnetic Cores]

Various powders for magnetic cores were produced by using raw material powders of different compositions and different production methods from those in Example 1 or Example 2 and changing the nitriding treatment condition (temperature). Then, the vicinities of particle surfaces of the powders thus obtained were observed using AES, XRD, or a scanning-type transmission electron microscope (STEM). The contents thereof will be specifically described below.

<Production of Samples>

(1) Raw Material Powder

Gas-water-atomized powders comprising six types of Fe—Si—Al-based alloys of different compositions as listed in Table 4 were prepared as raw material powders. All the gas-water-atomized powders were each produced through atomizing a molten raw material into a nitrogen gas atmosphere using nitrogen gas and then cooling it by water cooling. Oxygen concentrations of the gas-water-atomized powders are also listed in Table 4. Method of specifying the oxygen concentration is as described previously. The gas-water-atomized powder is considered to be more easily formed with oxidized films (in particular, Al—O films) on the particle surfaces than the gas-atomized powder because the high-temperature particles after being atomized react with water as the cooling medium.

Each raw material powder was classified using sieves of predetermined mesh sizes and an electromagnetic vibratory sieve shaker (available from Retsch). In the present example, also as listed in Table 4, the particle size of each powder was "−180."

(2) Nitriding Treatment Step (Insulating Layer Forming Step)

Each powder was put into a heat treatment furnace and the nitriding treatment (heating) under the condition as listed in Table 4 was performed in a flow of nitrogen gas ($N_2$). Soft magnetic powders were thus obtained after the nitriding treatment (Samples 41 to 48, Samples D1 to D3, and Sample D6).

<Observation of Samples>

(1) AES was performed for powder particles extracted arbitrarily from each of Sample 41, Sample 43, Sample 46, and Sample D6 to analyze the composition distribution in the vicinity of the surface (range from the outermost surface to a depth of 500 nm) of each particle. Profiles are illustrated in FIG. 5A to FIG. 5D (which are also referred to as "FIG. 5" collectively and simply).

Figure 6:
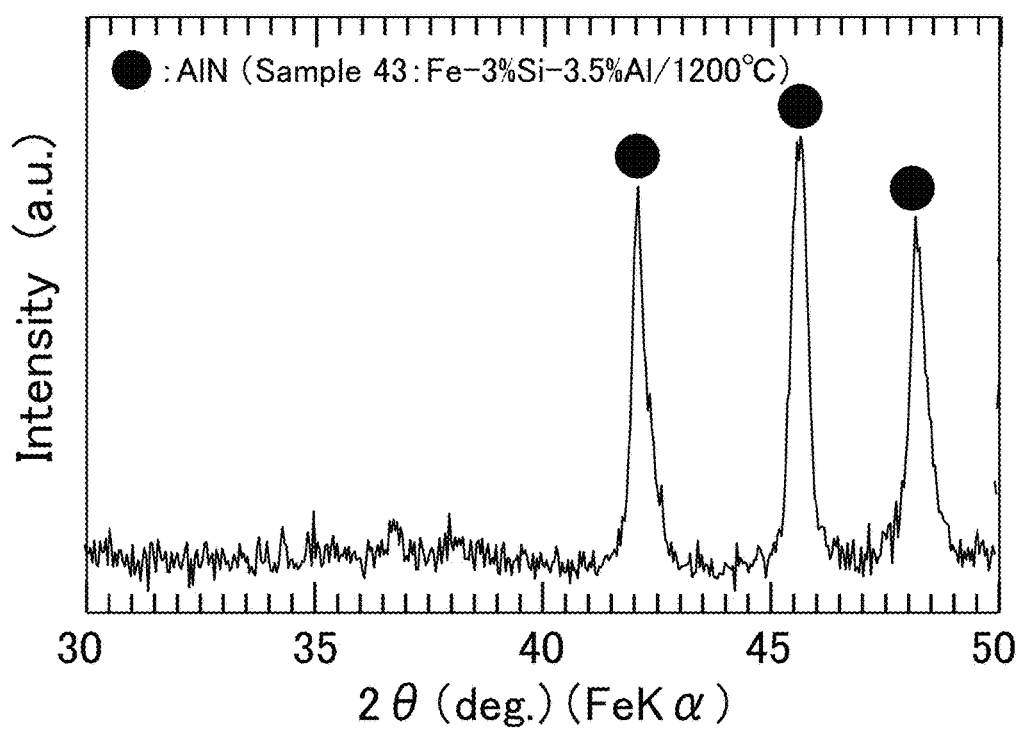
FIG. 6 is an XRD profile chart representing the vicinities of surfaces of soft magnetic particles (Sample 43) after nitriding treatment.

(2) Vicinities of the surfaces of powder particles extracted arbitrarily from Sample 43 were analyzed by XRD. The profile thus obtained is illustrated in FIG. 6. The XRD was conducted in the same manner as in Example 1.

Figure 7:
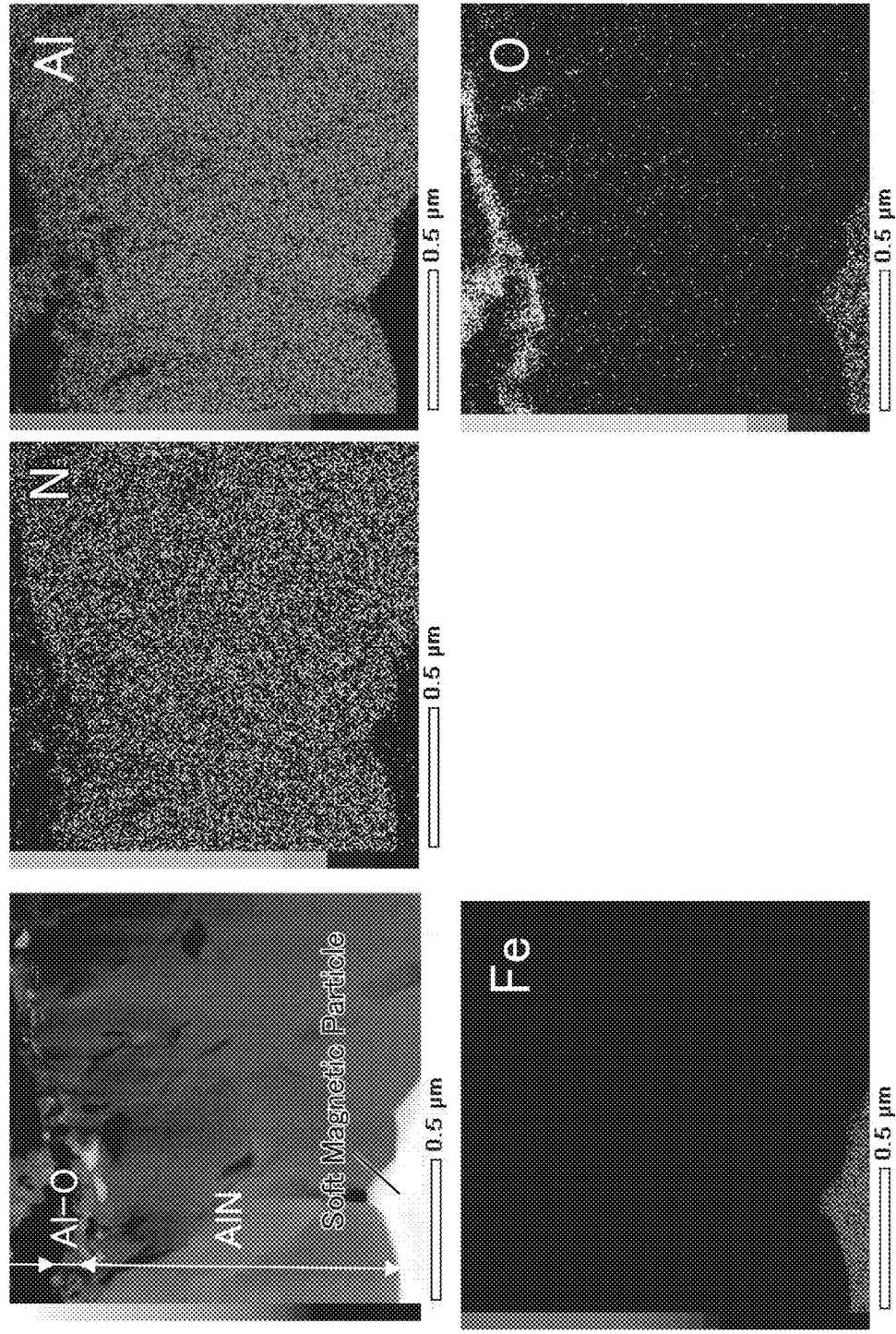
FIG. 7 depicts a dark-field STEM image and STEM-EDX element mapping images in relation to the vicinity of a surface of soft magnetic particles (Sample 46) after nitriding treatment.

(3) A scanning-type transmission electron microscope (STEM: JEM-2100F available from JEOL Ltd.) was used to observe a sample for observation that was prepared from powder particles of Sample 46 using a focused-ion-beam microsampling method (FIB method). FIG. 7 presents a dark-field image of the surface part of a particle thus obtained, together with mapping images of elements (N, Al, Fe, and O) contained therein.

[Powder Magnetic Core]

Powder magnetic cores were produced using powders (insulator-coated powder) of respective samples produced in the above manner and the specific resistance and radial crushing strength of each product were measured/evaluated. The contents thereof will be specifically described below.

<Production of Powder for Magnetic Cores>

(1) Insulator-Coated Powder

In addition to the powders (Samples 41 to 48 and Samples D1 to D3) obtained by performing the nitriding treatment for the gas-water-atomized powders (soft magnetic powders) as described above, a soft magnetic powder (Sample D4) without being treated with nitriding treatment and a soft magnetic powder (Sample D5) comprising an Al-free gas-water-atomized powder and without being treated with nitriding treatment were prepared. Powders of Sample D4 and Sample D5 are each also referred to as an untreated powder in a simple term.

(2) Glass Attaching Step

Either one of the low-melting-point glasses as listed in Table 3 was attached to the particle surfaces of the insulator-coated powder or untreated powder according to each sample except Sample D1 in the same manner as in Example 2 to produce a powder for magnetic cores. In all the samples, the additive amount of the low-melting-point glass (fine glass particle powder) was 1 mass % to the powder for magnetic cores as a whole (100 mass %).

<Production of Powder Magnetic Core>

(1) Molding Step

A compact was produced by a mold lubrication warm high-pressure molding method using each powder for magnetic cores in the same manner as in Example 2. A circular ring-like shape (outer diameter: phi 39 mm×inner diameter: phi 30 mm×thickness: 5 mm) was employed. The molding pressure was 1,000 MPa in all the samples.

(2) Annealing Step

Each compact thus obtained was put into a heating furnace and heated for 30 minutes in an atmosphere of 750 degrees C. in which nitrogen gas was flowing. The annealing step was performed under the same condition for all the samples. Various powder magnetic cores (samples) as listed in Table 4 were thus obtained.

<Measurement of Powder Magnetic Core>

Figure 8:
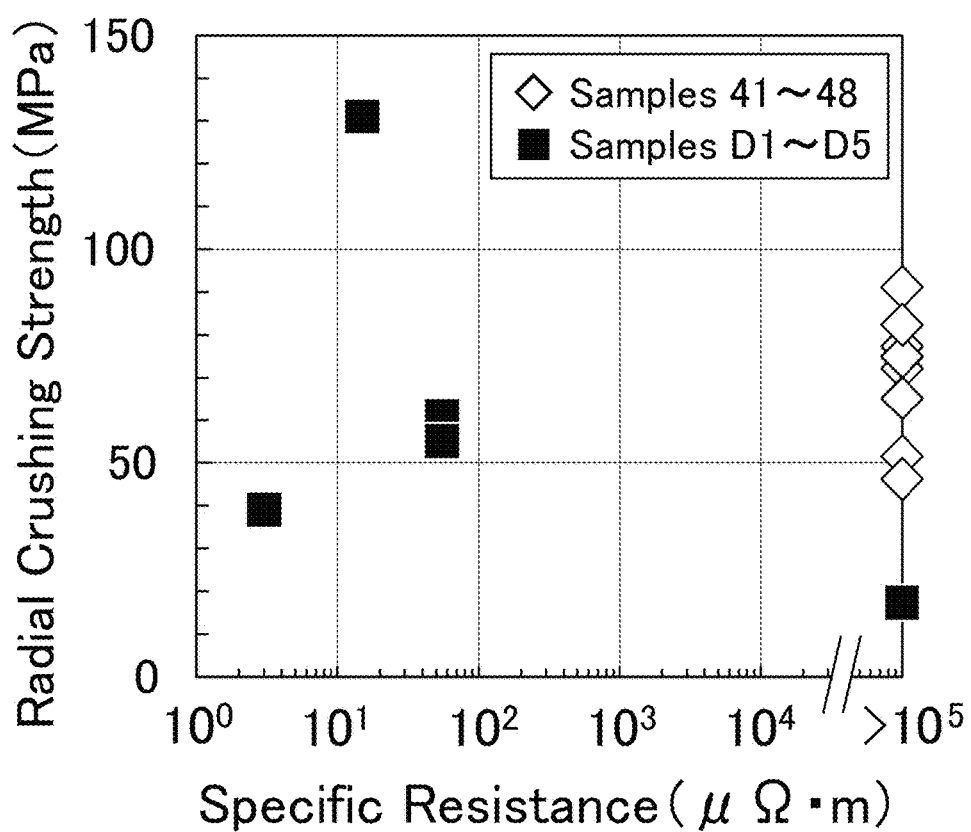
FIG. 8 is a dispersion diagram representing the relationship between a specific resistance and a radial crushing strength of a powder magnetic core according to each sample.

The specific resistance and radial crushing strength of each powder magnetic core were obtained. The specific resistance was measured and calculated in the same manner as in the case of Example 2. The radial crushing strength was measured using each circular ring-like powder magnetic core in accordance with JIS Z2507. These results are also listed in Table 4. FIG. 8 illustrates a relationship between the specific resistance and radial crushing strength of each sample.

«Evaluation»

(1) Powder for Magnetic Cores

As apparent from Table 4, FIG. 5, FIG. 6 and FIG. 7, it has been revealed that, even when using a gas-water-atomized powder in which the oxygen concentration is higher than that in a gas-atomized powder, the nitriding treatment is performed at a relatively high temperature thereby to allow uniform AlN layers (insulating layers, first coating layers) having a thickness of about 200 to 600 nm to be formed in the vicinities of the surfaces of soft magnetic particles.

As the nitriding treatment temperature increases, the amount of O (and of an oxide accordingly) contained in the AlN layers decreases. As found from comparison of Sample 41 (FIG. 5A) and Sample 43 (FIG. 5B) which have the same composition of the raw material powder, the thickness of the AlN layers increases as the nitrogen treatment temperature increases. It is also found that this tendency becomes significant as the Al ratio increases, by comparing these Samples 41 and 43 with Sample 46 (FIG. 5C).

Figure 5A:
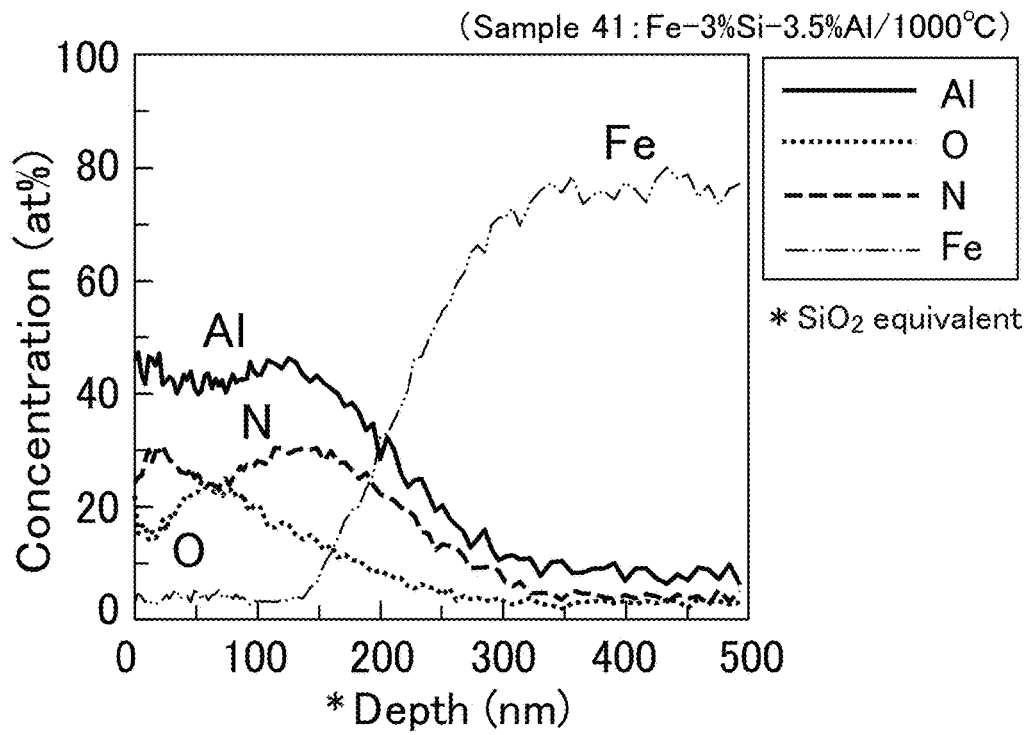
FIG. 5A is an AES chart obtained when observing the vicinities of surfaces of soft magnetic particles (Sample 41) after nitriding treatment.
Figure 5B:
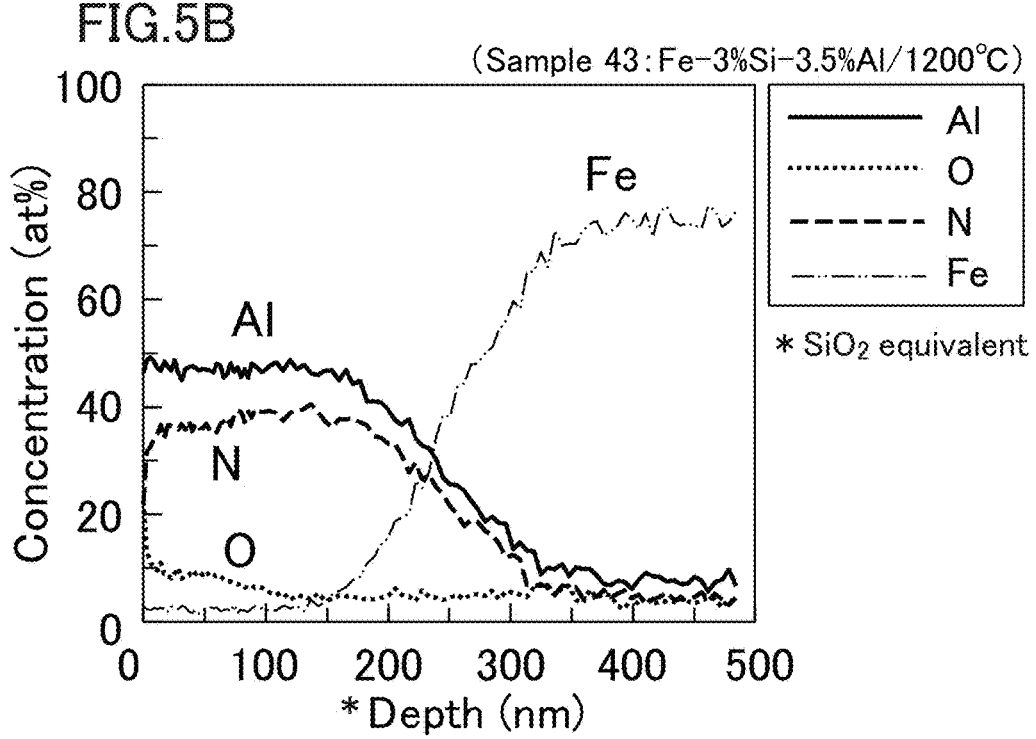
FIG. 5B is an AES chart obtained when observing the vicinities of surfaces of soft magnetic particles (Sample 43) after nitriding treatment.

On the other hand, as found from FIG. 5D for Sample D6, it has also been revealed that, when the oxygen concentration in the raw material powder is high, if the nitriding treatment temperature is insufficient, the Al—O-based oxide increases and the formation of AlN is insufficient. In FIG. 5A to FIG. 5C, a slight amount of O detected in the vicinities of particle outermost surfaces (depth of about 10 nm) is originated from the natural oxide films generated after the nitriding treatment (insulating layer forming step) as in the case of Example 1.

From the above, it can be said that, even when using a raw material powder having a high oxygen concentration, the nitriding treatment at a high temperature allows thick and uniform AlN layers to be formed on the particle surfaces because O existing in the vicinities of the particle surfaces of the raw material powder moves toward the inside of particles while Al existing in the soft magnetic particles moves toward the outermost surfaces. It can also be said that O existing in the vicinities of particle surfaces of the raw material powder is dispersed as oxidized aluminum (Al—O) in the vicinities of outermost surfaces of the AlN layers or inside the AlN layers.

(2) Powder Magnetic Core

As apparent from Table 4 and FIG. 8, it has been revealed that all the powder magnetic cores (Samples 41 to 48) in which the surfaces of the soft magnetic particles are coated with the AlN layers and the low-melting-point glass is present at the grain boundaries can exhibit a sufficient specific resistance and the radial crushing strength corresponding thereto.

On the other hand, it has also been revealed that, when the AlN layers (first coating layers) are present, but the low-melting-point glass layers (second coating layers) are not present as in Sample D1, the strength is considerably low even though the specific resistance is high. In contrast, it has further been revealed that, when the low-melting-point glass layers are present, but the AlN layers are not present as in Sample D2 to Sample D5, the specific resistance is considerably low even though the strength is high.

From the above, it has been revealed that, regardless of the type of raw material powder, an appropriate nitriding treatment is performed thereby to allow uniform AlN layers (first coating layers) to be formed on the surfaces of the soft magnetic particles. It has also been revealed that the powder magnetic core manufactured using a combination of the soft magnetic powder (insulator-coated powder) in which the particle surfaces are coated with the AlN layers and the low-melting-point glass can exhibit high specific resistance and high strength after the annealing at a high temperature.

TABLE 1

Production condition for powder for magnetic cores

| | Soft magnetic powder (raw material powder) | | | | Nitriding treatment condition | | Presence or absence of AlN |
|---|---|---|---|---|---|---|---|
| | Composition | | | Powder particle | | | |
| Sample No. | Whole powder (mass %) | Al ratio (Al/(Al + Si)) | Oxygen concentration (mass %) | size (µm) | Temperature (° C.) | Time (hr) | |
| 11 | Fe-0.5%Si-0.5%Al | 0.50 | 0.07 | −180 | 900 | 2 | Present |
| 12 | Fe-1.6%Si-1.3%Al | 0.45 | 0.03 | | | | |
| 13 | | | | | 700 | | Absent |
| 14 | Fe-4.0%Si-1.7%Al | 0.30 | 0.36 | | 900 | | |
| 15 | Fe-0.02%Si-0.8%Al | 0.98 | 0.04 | | | | Present |
| 16 | Fe-0.01%Si-3.3%Al | 1.00 | 0.01 | | | | |

TABLE 2

Production condition for powder magnetic core

| | Soft magnetic powder | | | | First coating layer | | |
|---|---|---|---|---|---|---|---|
| | Composition | | | Powder particle | | Nitriding treatment condition | |
| Sample No. | Whole powder (mass %) | Al ratio (Al/(Al + Si)) | Oxygen concentration (mass %) | size (µm) | Layer structure | Temperature (° C.) | Time (hr) |
| 21 | Fe-1.6%Si-1.3%Al | 0.45 | 0.03 | −180 | AlN | 900 | 2 |
| 22 | | | | | | | |
| 23 | | | | | | | |
| 24 | | | | | | | |
| 25 | | | | | | | |
| 26 | | | | | | | |
| 27 | | | | | | | |
| 28 | | | | | | | |
| 29 | | | | | | | |
| 30 | | | | −250 | | | |
| 31 | Fe-0.01%Si-3.3%Al | 1.00 | 0.01 | −180 | | | |
| C1 | Fe-1.6%Si-1.3%Al | 0.45 | 0.03 | −180 | AlN | 900 | 2 |
| C2 | | | | | Unformed | 700 | 2 |
| C3 | | | | | Untreated | | |
| C4 | Fe-1%Si | — | — | 106-212 | Si—O-based | (Oxidizing treatment) | |
| C5 | Fe | | | | Fe—O-based | (Oxidizing treatment) | |
| C6 | Fe-1%Si | | | | Coated with silicone resin | | |

| | Production condition for powder magnetic core Second coating layer Low-melting-point glass | | Molding pressure (MPa) | Annealing temperature (° C.) | Properties of powder magnetic core | |
|---|---|---|---|---|---|---|
| Sample No. | Type (Composition) | Additive amount (mass %) | | | Bending strength (MPa) | Specific resistance (µΩ · m) |
| 21 | C | 0.6 | 1568 | 900 | 101 | 1500 |
| 22 | C | 1.0 | | | 102 | ≥10⁵ |
| 23 | C | 3.6 | | | 106 | ≥10⁵ |
| 24 | E | | | | 95 | 8200 |
| 25 | D | | | 750 | 21 | ≥10⁵ |
| 26 | C | 0.6 | | | 93 | 2900 |
| 27 | F | 3.6 | | 900 | 10 | ≥105 |
| 28 | B | | | | 13 | ≥10⁵ |
| 29 | A | 3.6 | | | 177 | ≥10⁵ |
| 30 | C | 0.2 | | 750 | 50 | 1500 |
| 31 | C | 1.0 | | 900 | 161 | 350 |
| C1 | — | | 1568 | 900 | 14 | 480 |
| C2 | C | 3.6 | | | 95 | 2 |
| C3 | C | 0.6 | | | 99 | 0.3 |
| C4 | A | 1.7 | | | 95 | 1 |

TABLE 2-continued

| | | | | | |
|---|---|---|---|---|---|
| C5 | D | 1.5 | 750 | 80 | 10 |
| C6 | A | 0.6 | | 55 | 240 |

TABLE 3

| Name | Low-melting-point glass composition | softening point (° C.) |
|---|---|---|
| A | $SiO_2$—$B_2O_3$—ZnO-based | 590 |
| B | $P_2O_5$—$Al_2O_3$-based | 380 |
| C | $SiO_2$—$B_2O_3$—ZnO—BaO-based | 600 |
| D | $SiO_2$—$B_2O_3$—$Na_2O$—CaO-based | 500 |
| E | $SiO_2$—$B_2O_3$—MgO-based | 710 |
| F | $SiO_2$—$Bi_2O_3$-based | 530 |
| G | $SiO_2$—$B_2O_3$—$Na_2O$—$Al_2O_3$-based | 500 |

TABLE 4

Production condition for powder magnetic core

| | Soft magnetic powder | | | | First coating layer | | |
|---|---|---|---|---|---|---|---|
| | Composition | | | Powder particle size (μm) | Layer structure (presence or absence of AlN) | Nitriding treatment condition | |
| Sample No. | Whole powder (mass %) | Al ratio (Al/(Al + Si)) | Oxygen concentration (mass %) | | | Temperature (° C.) | Time (hr) |
| 41 | Fe-3%Si-3.5%Al | 0.54 | 0.08 | −180 | AlN | 1000 | 5 |
| 42 | | | | | | 1100 | |
| 43 | | | | | | 1200 | |
| 44 | Fe-3%Si-2.5%Al | 0.45 | 0.06 | | | 1100 | |
| 45 | Fe-0.5%Si-3.5%Al | 0.88 | 0.14 | | | | |
| 46 | Fe-2%Si-3.5%Al | 0.64 | 0.08 | | | | |
| 47 | Fe-4%Si-3.5%Al | 0.47 | 0.06 | | | | |
| 48 | Fe-3%Si-4.5%Al | 0.60 | 0.07 | | | | |
| D1 | Fe-0.5%Si-3.5%Al | 0.88 | 0.14 | −180 | AlN | 1000 | 2 |
| D2 | | | | | Unformed | 600 | 2 |
| D3 | | | | | | 750 | 2 |
| D4 | | | | | | Untreated | |
| D5 | Fe-1%Si | — | — | −180 | — | | |
| D6 | Fe-0.5%Si-3.5%Al | 0.88 | 0.14 | −180 | Al—O (AlN) | 900 | 2 |

| | Production condition for powder magnetic core Second coating layer Low-melting-point glass | | | | Properties of powder magnetic core | |
|---|---|---|---|---|---|---|
| Sample No. | Type (Composition) | Additive amount (mass %) | Molding pressure (MPa) | Annealing temperature (° C.) | Radial strength crushing (MPa) | Specific resistance (μΩ·m) |
| 41 | G | 1.0 | 1000 | 750 | 77 | ≥$10^5$ |
| 42 | | | | | 72 | ≥$10^5$ |
| 43 | | | | | 51 | ≥$10^5$ |
| 44 | | | | | 75 | ≥$10^5$ |
| 45 | | | | | 91 | ≥$10^5$ |
| 46 | | | | | 82 | ≥$10^5$ |
| 47 | | | | | 46 | ≥$10^5$ |
| 48 | | | | | 65 | ≥$10^5$ |
| D1 | — | | | | 17 | ≥$10^5$ |
| D2 | A | 1.0 | 1000 | 750 | 61 | 55 |
| D3 | | | | | 55 | 55 |
| D4 | C | | | | 131 | 15 |
| D5 | A | 1.0 | 1000 | 750 | 39 | 3 |
| D6 | — | | | | — | — |

The invention claimed is:

1. A powder magnetic core comprising:
    soft magnetic particles;
    a first coating layer that coats a surface of each of the soft magnetic particles and comprises aluminum nitride; and
    a second coating layer that coats at least a part of a surface of the first coating layer and comprises a low-melting-point glass having a softening point lower than an annealing temperature for the soft magnetic particles,
    wherein the soft magnetic particles comprise an iron alloy that contains Al and Si,
    an Al ratio that is a mass ratio of a content of Al in the iron alloy to a total content of Al and Si in the iron alloy is 0.45 or more, and
    when the iron alloy as a whole is 100 mass %, the total content of Al and Si in the iron alloy is 10 mass % or less.

2. The powder magnetic core as recited in claim 1, wherein the first coating layer contains an oxide.

3. The powder magnetic core as recited in claim 2, wherein the oxide consists of Al and O.

4. The powder magnetic core as recited in claim 1, wherein the low-melting-point glass contains a borosilicate-based glass.

5. The powder magnetic core as recited in claim 1, wherein the low-melting-point glass is contained at 0.1 to 5 mass % when the powder magnetic core as a whole is 100 mass %.

6. The powder magnetic core as recited in claim 5, wherein the low-melting-point glass is contained at 0.2 to 3.6 mass % when the powder magnetic core as a whole is 100 mass %.

7. The powder magnetic core as recited in claim 1, wherein the softening point of the low-melting-point glass is 800 degrees C. or lower.

8. A powder for magnetic cores, the powder comprising:
    soft magnetic particles;
    an insulating layer that coats a surface of each of the soft magnetic particles and comprises aluminum nitride; and a low-melting-point glass that is attached onto the insulating layer and has a softening point lower than an annealing temperature for the soft magnetic particles,
    the powder being used for manufacturing of the powder magnetic core as recited in claim 1.

9. A method of manufacturing a powder for magnetic cores, the method comprising an insulating layer forming step of heating soft magnetic particles to 800 degrees C. to 1300 degrees C. in a nitriding atmosphere thereby to form an insulating layer on a surface of each of the soft magnetic particles, the soft magnetic particles comprising an iron alloy that contains Al and Si, the insulating layer comprising aluminum nitride,
    wherein an Al ratio that is a mass ratio of a content of Al in the iron alloy to a total content of Al and Si in the iron alloy is 0.45 or more, and
    when the iron alloy as a whole is 100 mass %, the total content of Al and Si in the iron alloy is 10 mass % or less.

10. A method of manufacturing a powder magnetic core, the method comprising:
    a filling step of filling a mold with the powder for magnetic cores as recited in claim 8;
    a molding step of compression-molding the powder for magnetic cores in the mold; and
    an annealing step of annealing a compact obtained after the molding step.

* * * * *

UNITED STATES PATENT AND TRADEMARK OFFICE
CERTIFICATE OF CORRECTION

| | | |
|---|---|---|
| PATENT NO. | : 10,497,500 B2 | Page 1 of 1 |
| APPLICATION NO. | : 15/500957 | |
| DATED | : December 3, 2019 | |
| INVENTOR(S) | : Masashi Ohtsubo et al. | |

It is certified that error appears in the above-identified patent and that said Letters Patent is hereby corrected as shown below:

On the Title Page

Item (73) Assignee:
Delete "TOYOTA JIDOSHA KABUHIKI KAISHA"
Insert --TOYOTA JIDOSHA KABUSHIKI KAISHA--

Signed and Sealed this
Seventeenth Day of March, 2020

Andrei Iancu
*Director of the United States Patent and Trademark Office*